(12) United States Patent
Nagura et al.

(10) Patent No.: US 12,428,037 B2
(45) Date of Patent: Sep. 30, 2025

(54) REMOTE SUPPORT SYSTEM, ON-VEHICLE APPARATUS, REMOTE SUPPORT METHOD, REMOTE SUPPORT PROGRAM

(71) Applicant: DENSO CORPORATION, Kariya (JP)

(72) Inventors: Toru Nagura, Kariya (JP); Kengo Sasaki, Kariya (JP); Satoshi Yoshinaga, Kariya (JP); Yasuhiro Hirayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 617 days.

(21) Appl. No.: 17/660,003

(22) Filed: Apr. 20, 2022

(65) Prior Publication Data

US 2022/0242447 A1 Aug. 4, 2022

Related U.S. Application Data

(63) Continuation of application No. PCT/JP2020/038491, filed on Oct. 12, 2020.

(30) Foreign Application Priority Data

Oct. 22, 2019 (JP) ................................ 2019-192349

(51) Int. Cl.
*B60W 60/00* (2020.01)
*B60W 50/00* (2006.01)

(52) U.S. Cl.
CPC ...... *B60W 60/005* (2020.02); *B60W 50/0098* (2013.01); *B60W 2556/45* (2020.02); *B60W 2720/10* (2013.01)

(58) Field of Classification Search
CPC .......... B60W 60/005; B60W 50/0098; B60W 2556/45; B60W 2720/10; B60W 60/00; B60W 50/00; G08G 1/09; G08G 1/16
See application file for complete search history.

(56) References Cited

U.S. PATENT DOCUMENTS

| 9,507,346 B1 | 11/2016 | Levinson et al. |
| 10,618,523 B1* | 4/2020 | Fields ............. B60W 60/00182 |
| 2016/0021178 A1* | 1/2016 | Liu .......................... H04L 41/06 370/216 |
| 2018/0074490 A1* | 3/2018 | Park ...................... G05D 1/0027 |
| 2018/0297609 A1 | 10/2018 | Bozsik |
| 2019/0137999 A1 | 5/2019 | Taguchi et al. |
| 2019/0354111 A1* | 11/2019 | Cheng .................. G05D 1/0011 |
| 2020/0209888 A1* | 7/2020 | Sakai ................... G05D 1/0276 |

(Continued)

FOREIGN PATENT DOCUMENTS

JP 2018-538647 A 12/2018

*Primary Examiner* — Donald J Wallace
(74) *Attorney, Agent, or Firm* — Maschoff Brennan

(57) ABSTRACT

A remote support system is provided with an acquiring unit that acquires management information for managing at least one of a communication state between an autonomous driving support center and an autonomous driving vehicle at a plurality of locations, and an environmental state in the vicinity of the autonomous driving vehicle at a plurality of locations; and an execution unit that executes an operation for an operator performing a remote support of the autonomous driving vehicle in accordance with at least one of the communication state and the environmental state, the operation restricting a remote support function included in an operator terminal used by the operator.

15 Claims, 16 Drawing Sheets

(56) References Cited

U.S. PATENT DOCUMENTS

| | | | |
|---|---|---|---|
| 2020/0239023 A1* | 7/2020 | Srinivasan | G05D 1/0027 |
| 2020/0239024 A1* | 7/2020 | Srinivasan | G05D 1/249 |
| 2020/0264619 A1* | 8/2020 | Joseph | G08G 1/096816 |
| 2020/0272142 A1* | 8/2020 | Beauvillain | G05D 1/005 |
| 2020/0391756 A1* | 12/2020 | Wang | B60W 10/04 |
| 2021/0061306 A1* | 3/2021 | Dagan | H04W 4/40 |
| 2021/0197808 A1 | 7/2021 | Maeda et al. | |
| 2021/0325871 A1 | 10/2021 | Taguchi et al. | |
| 2024/0227833 A1* | 7/2024 | Fields | G05D 1/0061 |

* cited by examiner

25C

| OPERATOR | SKILL | YEARS OF SERVICE | FUNCTIONAL RESTRICTION |
|---|---|---|---|
| A | LEVEL 1 | 20 YEARS | RESTRICT ONLY FUNCTION A |
| B | LEVEL 2 | 10 YEARS | RESTRICTFUNCTIONS A AND B |
| C | LEVEL 3 | 5 YEARS | RESTRICT FUNCTION A, B AND C |
| ... | ... | ... | ... |

REMOTE SUPPORT SYSTEM, ON-VEHICLE APPARATUS, REMOTE SUPPORT METHOD, REMOTE SUPPORT PROGRAM

CROSS-REFERENCE OF RELATED APPLICATION

This application is the U.S. bypass application of International Application No. PCT/JP2020/038491 filed on Oct. 12, 2020, which designated the U.S. and claims priority to Japanese Application No. 2019-192349 filed on Oct. 22, 2019, the contents of these are incorporated herein by reference.

BACKGROUND

Technical Field

The present disclosure relates to remote support system, on-vehicle apparatus, remote support method and remote support program.

Description of the Related Art

A patent literature discloses a remote monitoring system for monitoring a state of vehicle of an autonomous vehicle by a communication periodically performed between an autonomous driving support center and the autonomous vehicle. According to the remote support system, the autonomous vehicle automatically stops when communication is interrupted, and transmits a vehicle stop signal and a camera image. The autonomous driving support center confirms the camera image and determines whether autonomous driving can be resumed. The autonomous vehicle resumes autonomous driving in response to a start signal received from the autonomous support center.

SUMMARY

A remote support system according to a first aspect of the present disclosure is provided with an acquiring unit that acquires management information for managing at least one of a communication state between an autonomous driving support center and an autonomous driving vehicle, and an environmental state in the vicinity of the autonomous driving vehicle; and an execution unit that executes an operation for an operator performing a remote support of the autonomous driving vehicle in accordance with at least one of the communication state and the environmental state, the operation restricting a remote support function included in an operator terminal used by the operator.

BRIEF DESCRIPTION OF THE DRAWINGS

The above-described objects and other objects, features and advantages of the present disclosure will be clarified further by the following detailed description with reference to the accompanying drawings. The drawings are.

DETAILED DESCRIPTION OF THE PREFERRED EMBODIMENTS

A patent literature JP-2019-87015 (corresponding to U.S. Publication Nos. 2019/0137999 and 2021/0325871) discloses a remote monitoring system for monitoring a state of vehicle of an autonomous vehicle by a communication periodically performed between an autonomous driving support center and the autonomous vehicle. According to the remote support system, the autonomous vehicle automatically stops when communication is interrupted, and transmits a vehicle stop signal and a camera image. The autonomous driving support center confirms the camera image and determines whether autonomous driving can be resumed. The autonomous vehicle resumes autonomous driving in response to a start signal received from the autonomous support center In this regard, contents of executable remote support may be restricted depending on a communication state and an environmental state of the autonomous vehicle. For example, when communication is unstable so that images are delayed, it is difficult to perform a timing control such as right turn support in an intersection. Accordingly, in such a case, it is preferable to restrict the timing control. According to the technique disclosed by the above-described patent literature, remote support of the autonomous vehicle can be performed. However, as described above, a restriction of remote support depending on the communication state and the environmental state of the autonomous vehicle has not been taking into account in the technique disclosed by above-described patent literature.

Hereinafter, with reference to the drawings, an example of an embodiment in which the technique of the present disclosure is embodied will be described in detail.

First Embodiment

Figure 1:
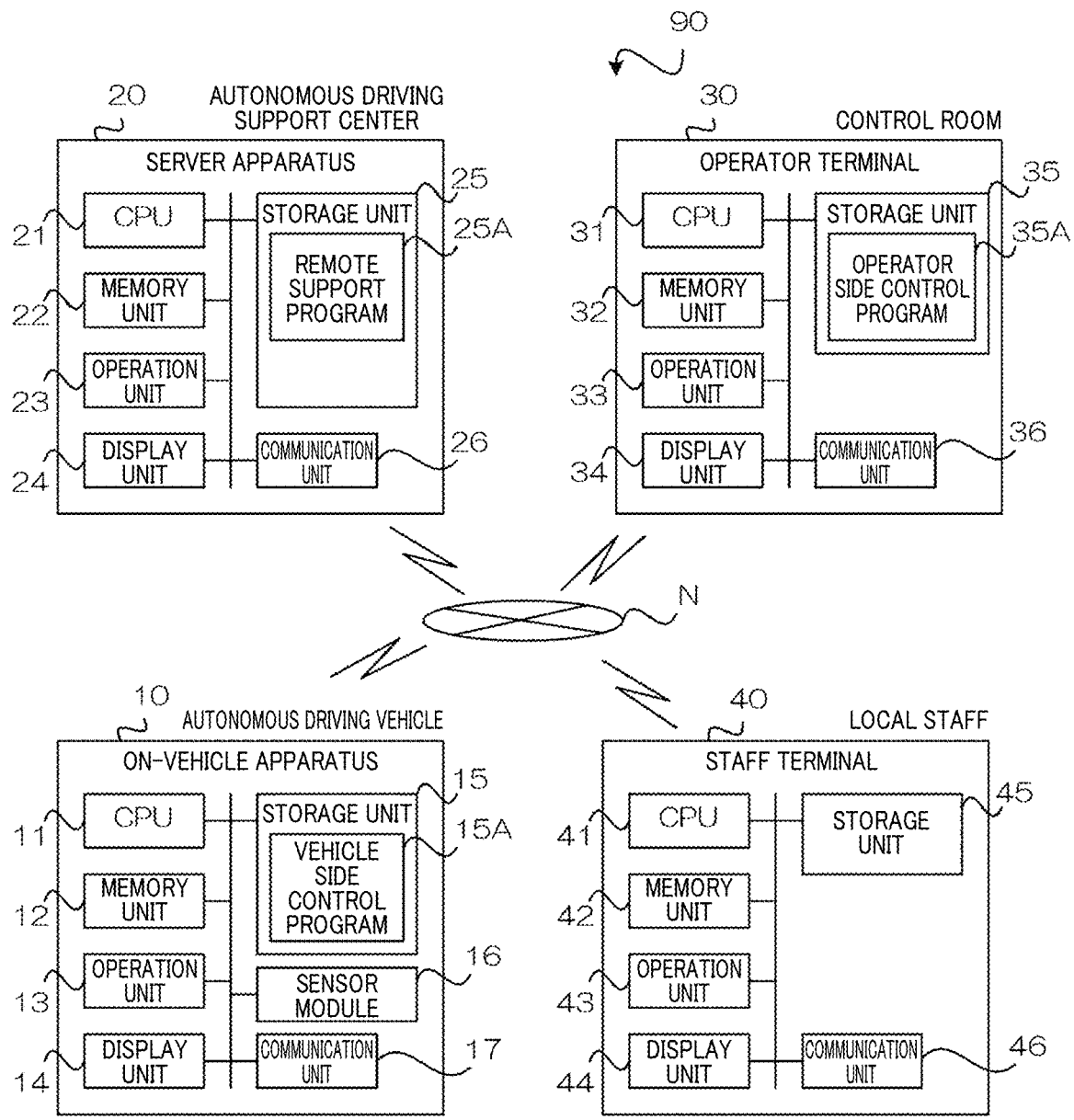
FIG. 1 is one example of an electrical configuration of a remote support system according to a first embodiment.

FIG. 1 is one example of an electrical configuration of a remote support system according to a first embodiment;

As shown in FIG. 1, a remote support system 90 according to the present embodiment is provided with an on-vehicle apparatus 10 mounted on an autonomous vehicle, a server apparatus 20 provided in an autonomous driving support center, and an operator terminal 30 provided in a control room and a staff terminal 40 as a portable equipment allowing a local staff to carry therewith. Note that the control room may be provided in the autonomous driving support center or provided in a place other than the autonomous driving support center.

The on-vehicle apparatus 10, the server apparatus 20, the operator apparatus 40 and the staff terminal 40 are communicably connected with each other via a network N. As an example, an internet, WAN (wide area network) or the like may serve as the network N. Further, the on-vehicle apparatus 10 and the staff terminal 40 are each connected to the network N via a wireless communication. The server apparatus 20 and the operator terminal 30 are each connected to the network N via a wired communication or a wireless communication.

The autonomous vehicle is able to automatically travel without driver's operation under a predetermined condition. The on-vehicle apparatus 10 includes a function of generating a travelling plan including travelling route to a destination in accordance with destination information such as address or latitude and longitude, and a function of controlling the automatic driving of the own vehicle. The on-vehicle apparatus 10 is provided with CPU (central processing unit) 11, a memory unit 12, an operation unit 13, a display unit 14, a storage unit 15, a sensor module 16 and a communication unknit 17.

The CPU 11 is an example of processors. The processors are defined in a broad sense, including a general processor (e.g. CPU) and a dedicated processor (e.g. GPU: graphics processing unit, ASIC: application specific integrated circuit, FPGA: field programmable gate array, programmable logic device). The memory unit 12 is configured of ROM (read only memory), RAM (random access memory) and the like.

For the storage unit 15, a HDD (hard disk drive), SSD (solid state drive), a flash memory or the like are used. In the storage unit 15, a vehicle side control program 15A for controlling the autonomous driving is stored. The vehicle side control program 15A may be installed in the on-vehicle apparatus 10 in advance, for example. The vehicle side control program 15A may be stored into a non-volatile non-transitory recording media and distributed through the network N and appropriately installed in the on-vehicle apparatus 10. As an example of the non-volatile non-transitory recording media, CD-ROM (compact disc read only memory), an optical disk, HDD, DVD-ROM (digital versatile disc read only memory), a flash memory and a memory card may be utilized.

The sensor module 16 is configured of various sensors for determining a state in the vicinity of the own vehicle. The sensor module 16 includes a plurality of cameras that capture a predetermined range from the vehicle with respect to a predetermined direction, a millimeter wave radar apparatus that transmits probe waves in a predetermines range outside the vehicle, and a LIDAR (light detection and ranging/laser imaging detection and ranging) that scans at least a predetermined range ahead of the vehicle. Moreover, the sensor module 16 may include a GPS (global positioning system) receiver mounted on the own vehicle. This GPS receiver acquires information such as current location of the vehicle and a current time.

The operation unit 13 is configured as an interface that accepts an operation input to the on-vehicle apparatus 10. For the display unit 14, an LCD (liquid crystal display), an organic EL (electro luminescence) display and the like are utilized. The display unit 14 may be integrated with a touch panel.

The communication unit 17 is connected to the network N such as an internet and a WAN, serving as a communication interface for communicating with the server apparatus 20.

Note that the on-vehicle apparatus 10 is connected to a travelling equipment (not shown) necessary for autonomous driving and performs the autonomous driving by controlling the travelling equipment. The travelling equipment includes, for example, an automatic power steering, an electronic control brake and an electronic control throttle.

The on-vehicle apparatus 10 controls the driving, the steering and the braking of the own vehicle so as to perform the autonomous driving in accordance with the travelling plan of the own vehicle. For the method of the autonomous driving, since various publicly known methods are present, it is not limited to the present embodiment.

The server apparatus 20 periodically communicates with the on-vehicle apparatus 10 of the autonomous vehicle, thereby monitoring the vehicle state of the autonomous vehicle, and performing the remote support to the autonomous vehicle when a remote support request is transmitted from the autonomous vehicle. For the server apparatus 20, for example, a general-purpose computer such as a server computer and a personal computer (PC) can be utilized. The server 20 is provided with a CPU 21, a memory unit 22, an operation unit 23, a display unit 24, a storage unit 25 and a communication unit 26.

The CPU 21 is an example of processors. Here, as described above, the processors are defined in broad sense, including a general processor and a dedicated processor. The memory unit 22 is configured as ROM and RAM or the like.

For the storage unit 25, for example, HDD, SSD, flash memory and the like can be utilized. A remote support program 25A for performing a remote support of the autonomous vehicle is stored in the storage unit 25. For example, the remote support program 25A may be installed in the server apparatus 20 in advance. The remote support program 25A may be stored into a non-volatile non transitory recording media and distributed through the network N and appropriately installed in the server apparatus 20.

The operation unit 23 is configured as an interface that accepts an operation input to the server apparatus 20. For the display unit 24, a liquid crystal display (LCD) and an organic EL display are utilized, for example. The display unit 24 may be integrated with a touch panel.

The communication unit 26 is connected to the network N such as an internet and a WAN, serving as a communication interface for communicating with each of the operator terminal 30 and the staff terminal 40.

The operator terminal 30 is configured as a dedicated terminal for an operator to perform the remote support applied to the autonomous driving vehicle. The operator terminal accepts, when receiving a support request from the autonomous driving vehicle, an operator call from the server 20. The operator terminal 30 communicates with the on-vehicle apparatus 10 and operates in accordance with the operator input while displaying an image of the autonomous driving vehicle. The operator terminal 30 is provided with a CPU 31, a memory unit 32, an operation unit 33, a display unit 34, a storage unit 35, and a communication unit 36.

The CPU 31 is an example of a processer. Here, as described above, the processers are defined in broad sense, including a general processor and a dedicated processor. The memory unit 32 is configured as ROM and RAM or the like.

For the storage unit 35, for example, HDD, SSD, flash memory and the like can be utilized. An operator side control program 35A is stored in the storage unit 35. For example, the operator support program 35A may be installed in the operator terminal 30 in advance. The operator support program 35A may be stored into a non-volatile non transitory recording media and distributed through the network N and appropriately installed in the operator terminal 30.

The operation unit 33 is configured as an interface that accepts an operation input to the operator terminal 30. For the display unit 24, a liquid crystal display (LCD) and an organic EL display can be utilized, for example. The display unit 24 may be integrated with a touch panel.

The communication unit 36 is connected to the network N such as the internet and a WAN, serving as a communication interface for communicating with each of the server apparatus 20 and the staff terminal 40. Note that the operator terminal 30 is configured to be capable of communication with the on-vehicle apparatus 10 via the server apparatus 20, but may be configured be capable of directly communicating with the on-vehicle apparatus 10 without the server 20.

The staff terminal 40 is configured as portable equipment allowing a local staff to carry it. Note that the local staff refers to a person in charge of support who is able to reach the autonomous driving vehicle to handle it. For the staff terminal, for example, a smartphone or a tablet terminal are utilized. The staff terminal 40 is provided with a CPU 41, a memory 42 and an operation unit 43, a display unit 44, a storage unit 45 and a communication unit 46.

Note that the staff terminal 40 is connected to the network N such as an internet and a WAN, being capable of communicating with each of the server apparatus 20 and the operator terminal 40.

Next, with reference to FIG. 2, a functional configuration of a remote support system 90 will be described.

Figure 2:
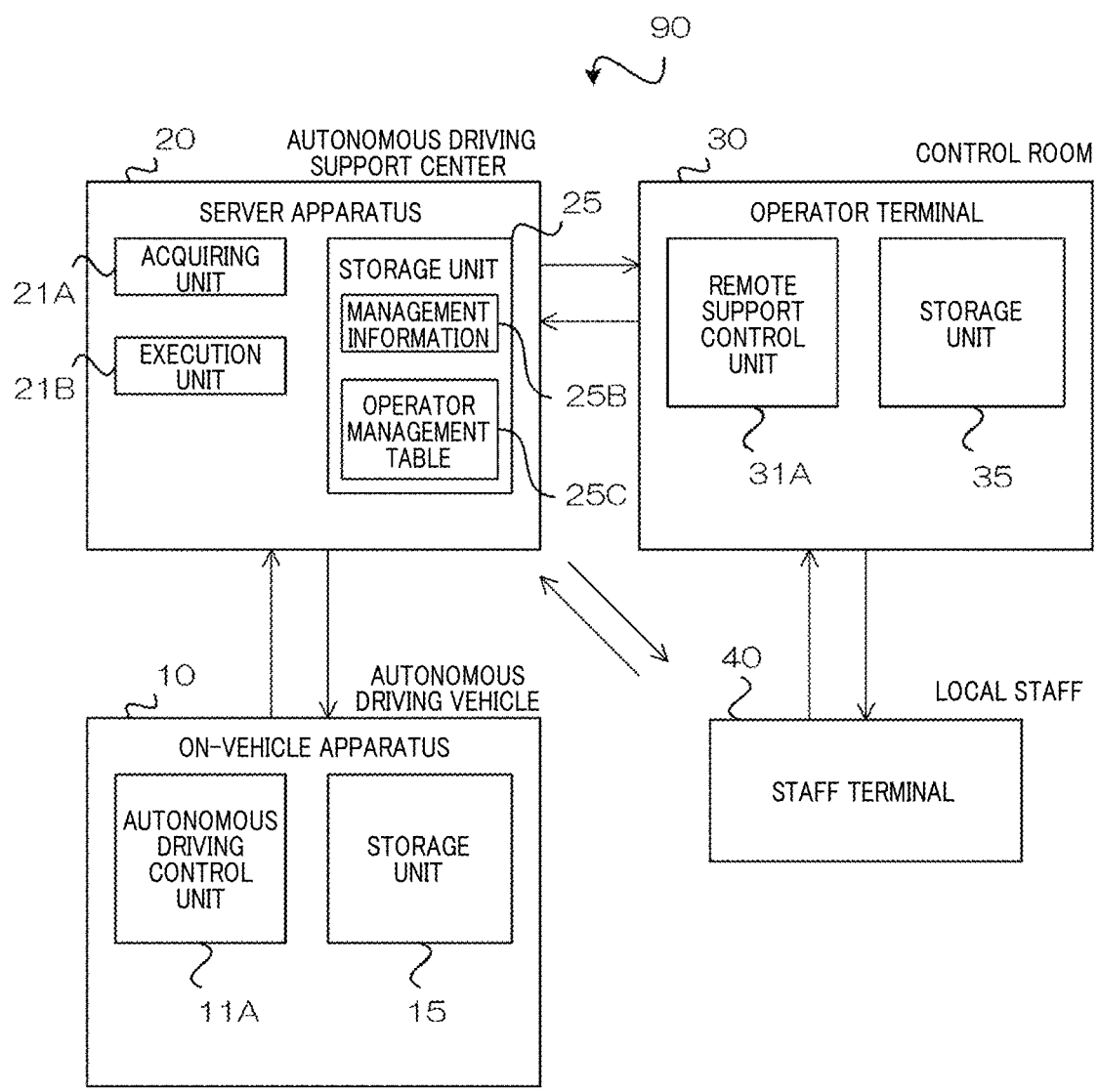
FIG. 2 is a block diagram showing one example of a functional configuration of the remote support system according to the first embodiment.

FIG. 2 is a block diagram showing an example of functional configuration of a remote support system according to the first embodiment As shown in FIG. 2, the CPU 21 of the server apparatus 20 according to the present embodiment serves as an acquiring unit 21A and an execution unit 21B. These acquiring unit 21A and the execution unit 21B are accomplished by reading and executing the remote support program 25A with the CPU21.

Further, the CPU 11 of the on-vehicle apparatus 10 according to the present embodiment serves as an autonomous driving control unit 11A. The autonomous driving control unit 11A is accomplished by reading and executing the vehicle side control program 15A with the CPU11.

Also, the CPU 31 of the operator terminal 30 according to the present embodiment serves as a remote support control unit 31A. The remote support control unit 31A is accomplished by reading and executing the operator side control program 35A with the CPU 31.

Firstly, the functional configuration of the server apparatus 20 will be described.

The storage unit 25 stores management information 25B. The management information 25B includes a communication state between an autonomous driving support center and an autonomous driving vehicle at a plurality of locations, where the autonomous vehicle is able to travel within an area to be managed by the autonomous driving support center. The communication state is expressed as information related to an operational design domain (ODD) of the remote support. The communication state includes, as an example, an area, a communication speed, a communication delay and the like. Further, the management information 25B may include an environmental state in the vicinity of the autonomous driving vehicle at a plurality of locations, where the autonomous vehicle is able to travel, within an area to be managed by the autonomous driving support center. Similar to the above-described communication state, the environmental state is expressed as information related to an operational design domain (ODD) of the remote support. The environmental state includes, as an example, a road curvature, a dead angle and the like. The management information 25B is information for managing at least one of these communication state and the environmental state.

Moreover, the management information 25B may include information related to the operational design domain (ODD) of the autonomous driving vehicle. Specifically, as an example, a travel road condition, a road shape, a weather, a road surface state, traffic state and the like. The travel road condition includes, for example, separation between sidewalk and driveway, a pavement state and the like. The road shape includes, as an example, a slope, a lane width and the like. The weather includes, as an example, rain, snow and wind speed and the like. The road surface state includes, as an example, frozen, flooded and the like. The traffic state includes, as an example, a construction area, an accident, parking on streets and the like.

In the storage unit 25, an operator management table 25C which will be described later is stored.

The acquiring unit 21A acquires the management information 25B from the storage unit 25. Also, the acquiring unit 21A acquires the positional information of the autonomous driving vehicle and the time information from the on-vehicle apparatus 10 of the autonomous driving vehicle. Moreover, the acquiring unit 21A acquires an image of the autonomous driving vehicle from the on-vehicle apparatus 10 mounted on the autonomous driving vehicle. Note that the image acquired by the acquiring unit 21A is transmitted to the operator terminal 30 from the server apparatus 20.

The execution unit 21B executes an operation for an operator performing the remote support of the autonomous driving vehicle in accordance with at least one of the communication state and the environmental state acquired from the management information 25B, the operation being required for restricting the remote support which is capable of being performed by the operator. Specifically, the required operation for restricting the remote support refers to an operation notifying the operator of the content of abnormality of at least one of the communication state and the environmental state. For example, a message "communication delay detected!" is made to be displayed on a screen of UI (user interface) of the operator terminal 30. Note that the notification may include a suggested action to be subsequently performed by the operator considering the content of the abnormality.

Further, the required operation for restricting the remote support may be an operation to restrict the function of remote support included in the operator terminal 30 used by the operator. For example, the operation may disable (disable pressing) some buttons used for the remote support or disable displaying (blackout) some of the buttons. However, when this restriction is suddenly executed, the operator may be confused due to this restriction. Hence, the restriction of functions may preferably be executed after displaying a message "function x will be restricted due to communication delay".

Further, the execution unit 21B may restrict the timing control function of the remote support in the case where the communication state indicates that a communication delay has occurred for a prescribed period (e.g. 1 second). The execution unit 21B may restrict the timing control function of the remote support in the case where the environmental state indicates either long construction site or low front visibility or low rear visibility. This timing includes a safety confirmation timing for an on-coming vehicle in an opposite lane or a rear vehicle in an adjacent lane when performing overtaking.

Figure 3:
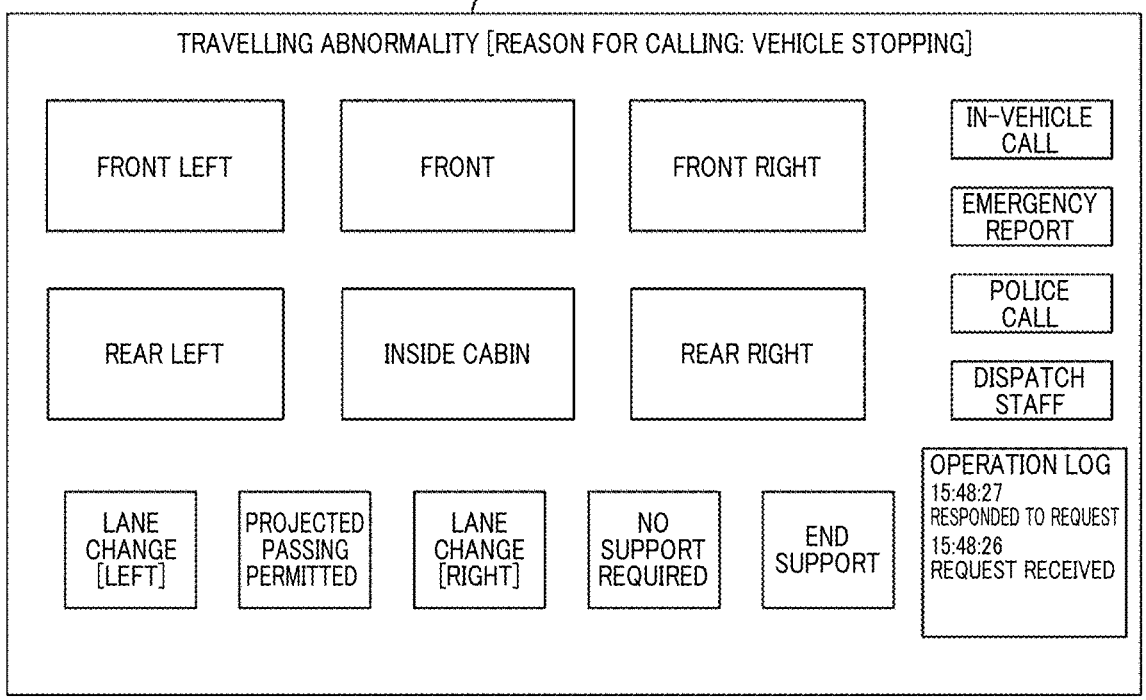
FIG. 3 is a diagram showing an example of UI screen of an operator terminal according to embodiments.

FIG. 3 is a front view diagram showing an example of UI screen 34A of the operator terminal according to the present embodiment.

The UI screen 34A shown in FIG. 3 is a screen when no functional restriction is performed. In the center of the UI screen 34A, a plurality of images (e.g. moving image) of the autonomous vehicle are displayed. In an example of FIG. 3, images of front left, front, rear left, inside vehicle cabin and rear right of the autonomous vehicle are shown. In the lower portion in the UI screen 34A, as an example of the plurality of buttons used for the remote support, lane change (left), enable projected passing, lane change (right), no support, and end support are displayed. The lane change (left) button is for instructing a lane change to the left side lane. The enable projected passing button is for instructing a passing from a travelling lane with projecting. The lane change (right) button is for instructing a lane change to the right side lane. The no support button is for notifying the remote support is unnecessary. The end support button is for notifying end of the remote support.

In the lower right portion of the UI screen 34A, an operation log that manages the operation log of the remote support is displayed. In the right side of the UI screen 34A, as an example of a plurality of buttons used when required, in-vehicle call, emergency report, police call and dispatch staff are displayed. The in-vehicle call button is for calling the passenger in the autonomous vehicle. The emergency report button is for calling 119. The call police button is for calling 110. The staff dispatch button is for communicating with the local staff.

Figure 4:
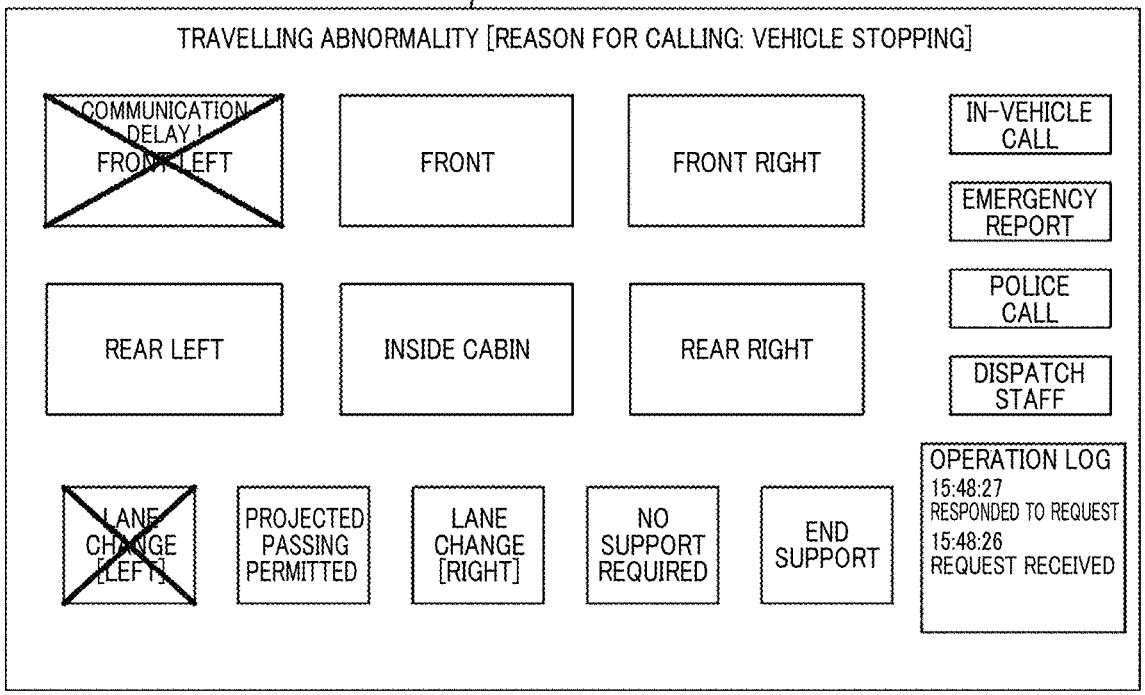
FIG. 4 is diagram showing an example of UI screen in which a part of functions is restricted according to embodiments.

FIG. 4 is a front view diagram showing an example of UI screen 34A when a part of function according to the present embodiment is restricted.

The UI screen 34A shown in FIG. 4 shows a state where a communication delay (e.g. delay for larger than or equal to 1 second) is indicated in the front left image. In this case, lane change to the left side lane may preferably be restricted. Hence, in the example shown in FIG. 4, a message "communication delay!" is displayed on a front left portion of the image, and the lane change (left) button is disabled.

Figures 5, 6:
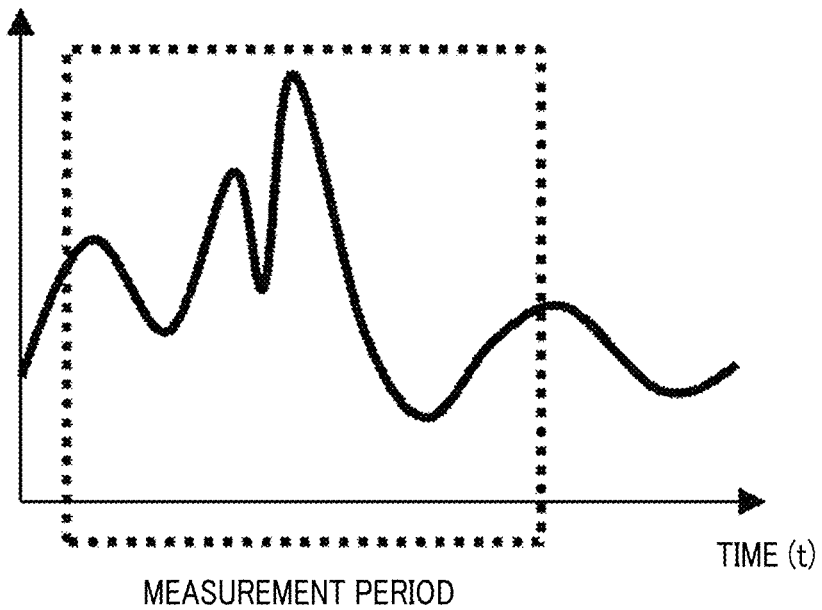
FIG. 5 is a graph showing an example of measurement information according to the embodiments.
FIG. 6 is a table showing an example of an operator management table according to the embodiments.

Also, the execution unit 21B may set the content of restriction on the function of remote support based on a measurement information shown in FIG. 5. The measurement information is included in the management information 25B. Also, the measurement information is acquired by measuring an index indicating the communication state for a prescribed period. The index indicating the communication state refers to a communication speed, a communication delay and the like.

FIG. 5 is a graph showing an example of the measurement information according to the present embodiment. In FIG. 5, the vertical axis indicates the communication delay (t: time) and the horizontal axis indicates time (t).

For example, in the case where the functional restriction is frequently switched between disable and enable depending on the communication state, the operator may be unable to perform appropriate judgement. Hence, as shown in FIG. 5, communication quality (communication delay in the example shown in FIG. 5) is measured for a prescribed period, and the content of the functional restriction is set using a value corresponding to worse side of the communication quality. Specifically, in the case where the function a and function b are restricted for the communication delay of T1 (seconds) and the function a is restricted for the communication delay of T2 less than T1, the contents of the functional restriction is set corresponding to the worse side communication quality T1 such that the function a and the function b are restricted for the communication delay of T2.

Also, the execution unit 21B may set the content of the functional restriction of the remote support to be different depending on at least one of skill and years of serve of the operator. In this case, as an example, an operator management table 25C is utilized.

FIG. 6 is an example of the operator management table 25C according to the present embodiment.

The operator management table 25C shown in FIG. 6 registers skill, years of service for each operator and the content of the functional restriction. As shown in FIG. 6, the functional restriction may be set such that the higher the skill of the operator (level 1 is the highest in the example of FIG. 6), the less the functional restriction, or the longer the years of service of the operator, the less the functional restriction.

Further, in the case where the communication state is interrupted for a prescribed period or a communication bandwidth cannot be secured for a prescribed time or more, the execution unit 21B may instruct, instead of the operator, the local staff who are able to reach the autonomous driving vehicle to handle it. Specifically, for the instruction to the local staff, a message or the like is displayed on the display unit 44 of the staff terminal 40.

Note that the acquiring unit 21A and the execution unit 21B according to the present embodiment is provided in the server apparatus 20. However, the acquiring unit 21A and the execution unit 21B may be provided in the operator terminal 30.

Next, functional configurations of the on-vehicle apparatus 10 and the operator terminal 30 will be described.

The autonomous driving control unit 11A of the on-vehicle apparatus 10 controls an autonomous driving of the own vehicle. Further, the autonomous driving control unit 11A controls autonomous driving in accordance with a remote support signal from the operator terminal 30, when the remote support is received from the operator.

The remote support control unit 31A of the operator terminal 30 controls the remote support of the autonomous driving vehicle. Specifically, the remote support control unit 31A, when the operator performs remote support, transmits a remote support signal to the autonomous driving vehicle, thereby controlling the remote support.

Next, with reference to FIG. 7, effects of the server apparatus 20 according to the first embodiment will be described.

Figure 7:
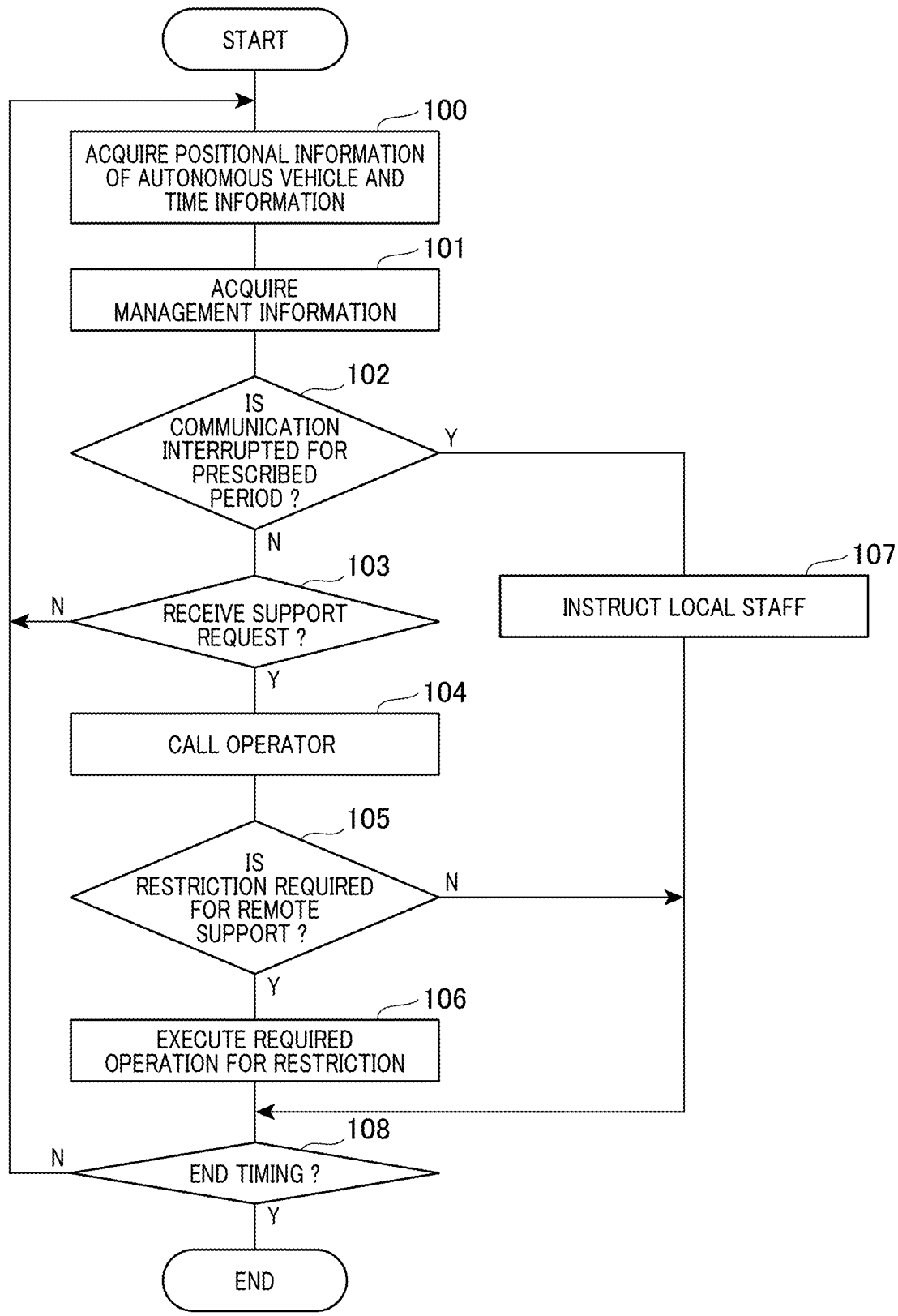
FIG. 7 is a flowchart showing an example of process of a remote support program according to the first embodiment.

FIG. 7 is a flowchart showing an example of processes of a remote support program 25A according to the first embodiment.

Firstly, when instructing the server apparatus 20 to monitor the vehicle state of the autonomous driving vehicle, the remote support program 25A is activated and the following respective steps are executed.

At step 100 shown in FIG. 7, the CPU 21 acquires the positional information of the autonomous driving vehicle and the time information from the on-vehicle apparatus 10 of the autonomous driving vehicle.

At step 101, the CPU 21 acquires the management information 25 from the storage unit 25.

At step 102, the CPU 21 determines whether the communication state with the autonomous driving vehicle is interrupted for a prescribed period. When the process determined that the communication state is not interrupted for a prescribed period (negative determination), the process proceeds to step 103, and when the process determined that the communication state is interrupted for a prescribed period (affirmative determination), the process proceeds to step 107. In these steps, it is determined whether communication is interrupted for a prescribed period, but it may be determined whether a communication bandwidth is not secured for a prescribed bandwidth or more. That is, in the case where sufficient communication bandwidth is secured by QoS (quality of service) for example, the process proceeds to step 103, and in the case where the sufficient communication bandwidth is not secured, the process proceeds to step 107.

At step 103, the CPU 21 determines whether a support request is received from the autonomous driving vehicle. When it is determined that the support request is received from the autonomous driving vehicle (affirmative determination), the process proceeds to step 104, and when it is determined that no support request is received from the autonomous driving vehicle, the process returns to step 100 and repeats the processes.

At step 104, the CPU 21 instructs the operator terminal 30 to call an operator.

At step 105, the CPU 21 determines whether restriction of the remote support is necessary. The determination whether the remote support is necessary is based on the management information 25B. An example of a case where the remote support is necessary includes (1) when it is estimated that the autonomous driving vehicle will travel on a route having high cost (described later), (2) a communication delay has occurred for a prescribed period (e.g. 1 second) on the image of the autonomous vehicle, (3) when it is estimated that the autonomous driving vehicle will be stopped at a location where a front visual field or a rear visual field is poor, (4) when it is predicted that the autonomous driving vehicle will stop at a location where the communication state between the autonomous driving vehicle and the autonomous driving support center is unstable. When it is determined that the restriction of the remote support is necessary (affirmative determination), the process proceeds to step 106, and when it is determined that the restriction of the remote support is unnecessary (negative determination), the process proceeds to step 108.

At step 106, the CPU 21 executes operations necessary for restricting the remote support which are applied to the operator terminal 30, and proceeds to step 108. The operations necessary for restricting the remote support are, for example, as shown in the above-described FIG. 4, an operation for displaying a message notifying the content of abnormality on at least one of the communication state and the environmental state on the operator terminal 30, or an operation for restricting the function of the remote support included in the operator terminal 30.

On the other hand, at step 107, the CPU 21 instructs the staff terminal 40 of the local staff to rapidly deal with the autonomous vehicle and proceeds to step 108. For example, as described above, the CPU 21 instructs the operation by displaying a message on the display unit 44 of the staff terminal 40.

At step 108, the CPU 21 determines whether it reaches the end timing of the remote support. When determined that it does not reach the end timing of the remote support (negative determination), the process returns to step 100 and repeats the processes, and when determined that it reaches the end timing of the remote support (affirmative determination), the process terminates the series of processes of the present remote support program 25A.

Next, with reference to FIG. 8, effects of the operator terminal 30 according to the first embodiment will be described.

Figure 8:
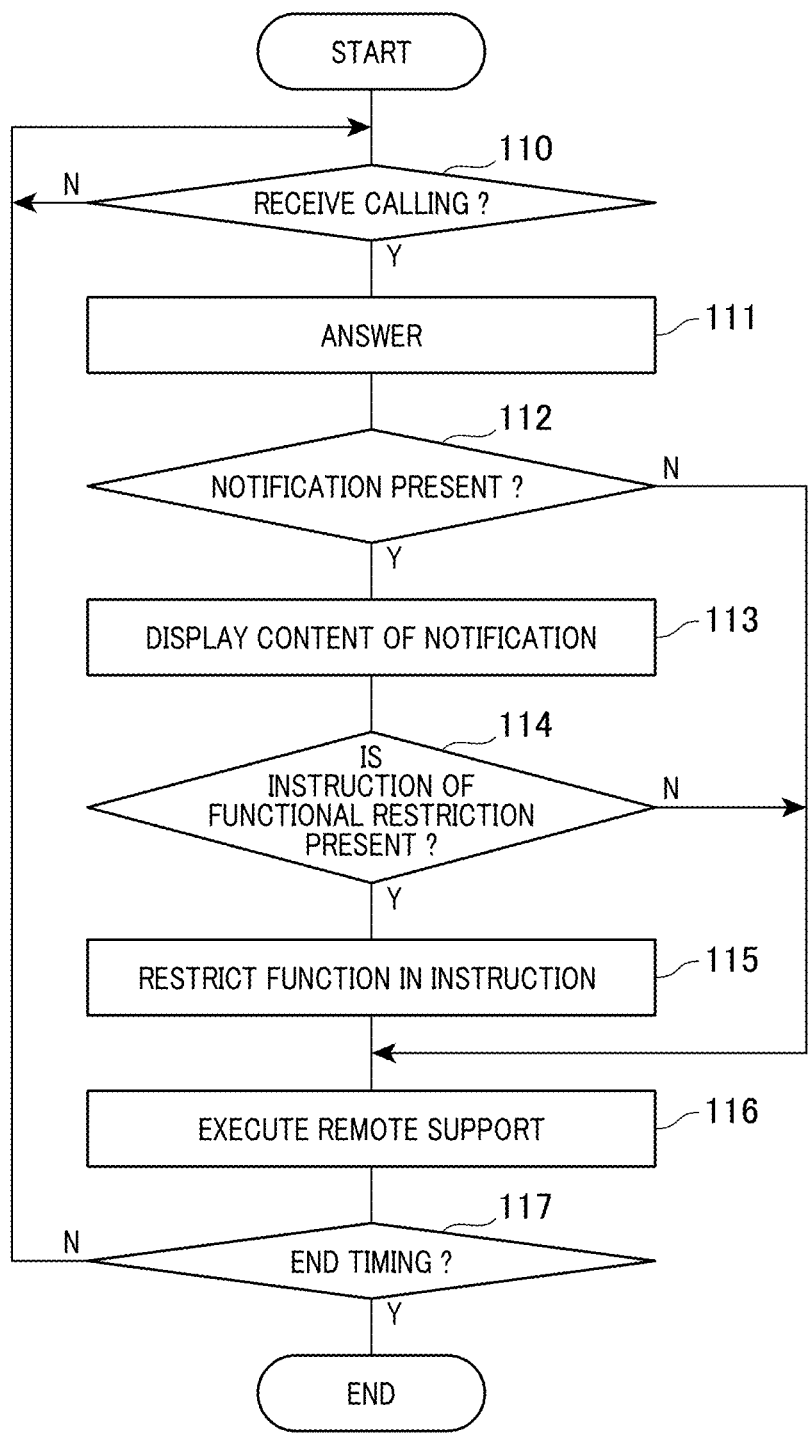
FIG. 8 is a flowchart showing an example of a process of an operator side control program according to the first embodiment.

FIG. 8 is a flowchart showing an example of processes of an operator side control program 35A according to the first embodiment.

At step 110 shown in FIG. 8, the CPU 31 determines whether an operator call sent from the server apparatus 20 is present. When determined that the operator call is present (affirmative determination), the process proceeds to step 111, and when determined that no operator call is present (negative determination), the process waits at step 110.

At step 111, the CPU 31 responds to the operator call at the above-described step 110.

At step 112, the CPU 31 determines whether a notification indicating an abnormality of at least one of communication state and the environmental state is present. Note that, this notification may include a suggested next action which should be taken by the operator based on the content of the abnormality as described above. When determined that the notification is present (affirmative determination), the process proceeds to step 113, and when determined that no notification is present (negative determination), the process proceeds to step 116.

At step 113, the CPU 31 displays, as a notification content, a message such as "communication delay detected!" shown in the above-described FIG. 4, in response to the notification of the above-described step 112.

At step 114, the CPU 31 determines whether an instruction of a functional restriction of the remote support sent from the server apparatus is present. When determined that an instruction of a functional restriction of the remote support is present (affirmative determination), the process proceeds to step 115, and when determined that an instruction of a functional restriction of the remote support is not present (negative determination), the process proceeds to step 116.

At step 115, the CPU 31 restricts, similar to the lane change (left) button as shown in FIG. 4, the function of the remote support as an example, in response to the instruction of the above-described step 114.

At step 116, the CPU 31 executes the remote support to the autonomous driving vehicle in accordance with an operation of the operator.

At step 117, the CPU 31 determines whether it reaches the end timing of the remote support. When determined that it does not reach the end timing of the remote support (negative determination), the process returns to step 110 and repeats the processes, and when determined that it reaches the end timing of the remote support (affirmative determination), the process terminates the series of processes of the present operator side control program 35A.

Next, with reference to FIG. 9, effects of the on-vehicle apparatus 10 according to the first embodiment will be described.

Figure 9:
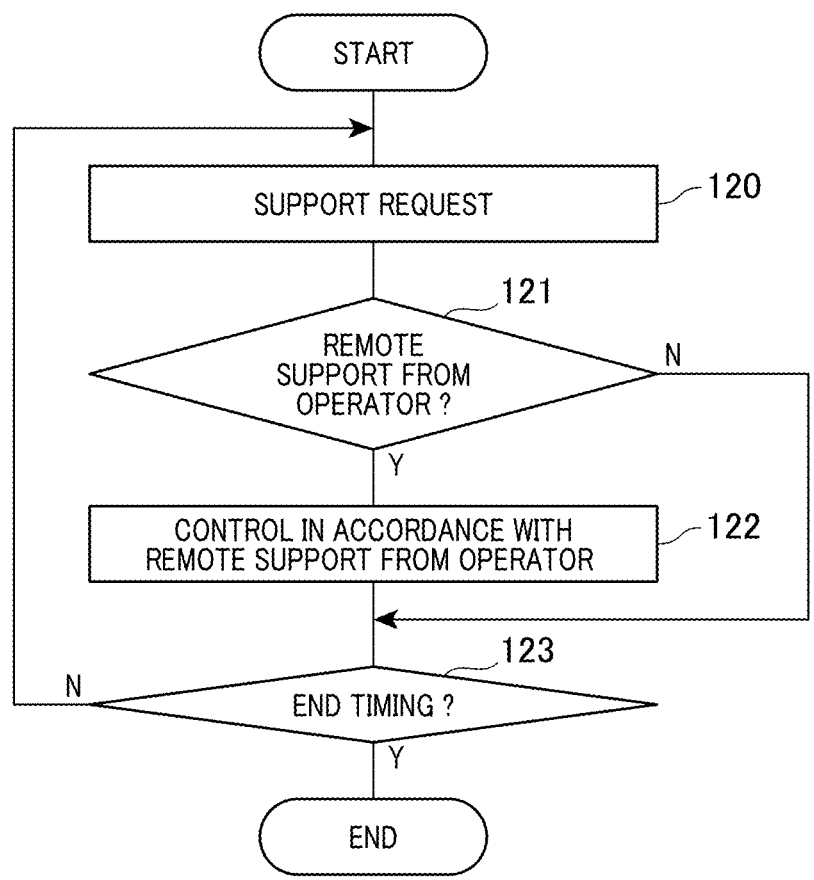
FIG. 9 is a flowchart showing an example of a process of a vehicle side control program according to the first embodiment.

FIG. 9 is a flowchart showing an example of processes of a vehicle side control program 15A according to the first embodiment.

At step 120 shown in FIG. 9, the CPU 11 transmits a support request of the remote support to the server apparatus 20.

At step 121, the CPU 11 determines whether remote support is performed from the operator terminal 30 in response to the support request transmitted at the above-described step 120. When determined that a remote support was performed from the operator terminal 30 (affirmative determination), the process proceeds to step 122, and when determined that no remote support was performed from the operator terminal 30 (negative determination), the process proceeds to step 123.

At step 122, the CPU 11 performs a control process in accordance with the remote support from the operator terminal 30 used by the operator.

At step 123, the CPU 11 determines whether it reaches the end timing of the remote support. When determined that it does not reach the end timing of the remote support (negative determination), the process returns to step 120 and repeats the processes, and when determined that it reaches the end timing of the remote support (affirmative determination), the process terminates the series of processes of the present vehicle side control program 15A.

Thus, according to the present embodiment, in the case where the remote support is required to be restricted responding to the support request of the autonomous driving vehicle, necessary operations to restrict the remote support is executed for the operator. Hence, the operator can be prevented from performing incorrect remote support.

Second Embodiment

According to the first embodiment, an embodiment is described in which necessary operations to restrict the remote support is executed for the operator, in the case where the remote support is required to be restricted responding to the support request of the autonomous driving vehicle. According to the present embodiment, an embodiment will be described in which an autonomous driving support center instructs the traveling of the autonomous driving vehicle in the case where the operator cannot perform the remote support operation.

Figure 10:
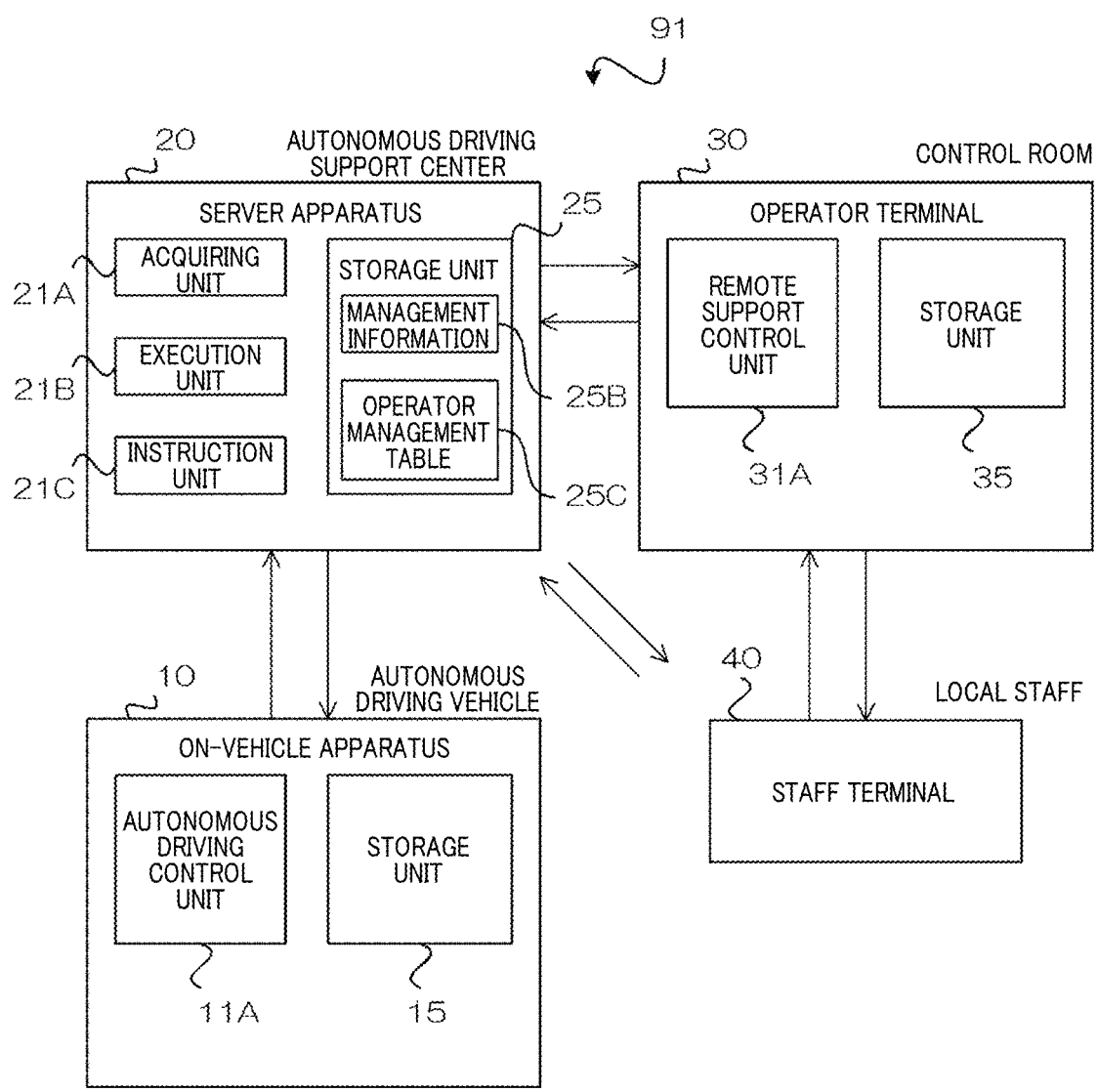
FIG. 10 is a block diagram showing an example of a functional configuration of a remote support system according to a second embodiment.

FIG. 10 is a block diagram showing an example of the functional configuration of a remote support system 91 according to a second embodiment. Note that constituents having the same function as the remote support system 90 described in the above-described first embodiment are applied with the same reference symbols and repetitive explanation will be omitted.

As shown in FIG. 10, the CPU 21 of the server apparatus 20 according to the present embodiment functions as an instruction unit 21C. The instruction unit 21C is accomplished by reading and executing the remote support program 25A with the CPU 21. The configuration of the server apparatus 20 which is provided with the instruction unit 21C differs from that of the above-described remote support system 90.

The instruction unit 21C sends a travelling instruction to the autonomous vehicle in the case where the operator would have difficulty dealing with the problem or the operator would be in a difficult situation dealing with the problem. Note that, the autonomous driving is not always required, but is required when the autonomous driving vehicle is not able to operate by itself. Hence, in the case where the remote support is required but it is difficult to perform the remote support, a problem arises that the autonomous driving vehicle will be stuck. A situation where the remote support is necessary includes a case of supporting a fire point or dealing with a hand-flag signal in a construction site which are predictable in advance, and a case of emergency care required for a passenger or dealing with a projected passing due to on-street parking which suddenly occur. Accordingly, it is preferable to send an instruction to avoid a high risk route (difficult situation is likely to occur) in which performing the remote support is deemed highly risky. With reference to FIGS. 11 to 14, an embodiment for sending a travel instruction to the autonomous driving vehicle will be described in detail. Note that, a case where the operator is in a difficult situation to deal with the problem or the operator would be in a difficult situation to deal with the problem (hereinafter referred to as a case where the operator is in a difficult situation in a difficult situation dealing with the problem dealing with the problem) is determined based on the management information 25B. A case where the operator is includes, for example, (1) when it is predicted that the autonomous driving vehicle will be travelling on a route having high risk, (2) a communication delay has occurred on an image of an autonomous driving vehicle for a prescribed period (e.g. 1 second) or more, (3) when it is predicted that the autonomous driving vehicle will stop at a location having low front visibility or low rear visibility, (4) when it is predicted that the autonomous driving vehicle will stop at a location where the communication state between the autonomous driving vehicle and the autonomous driving support center is unstable.

Figure 11:
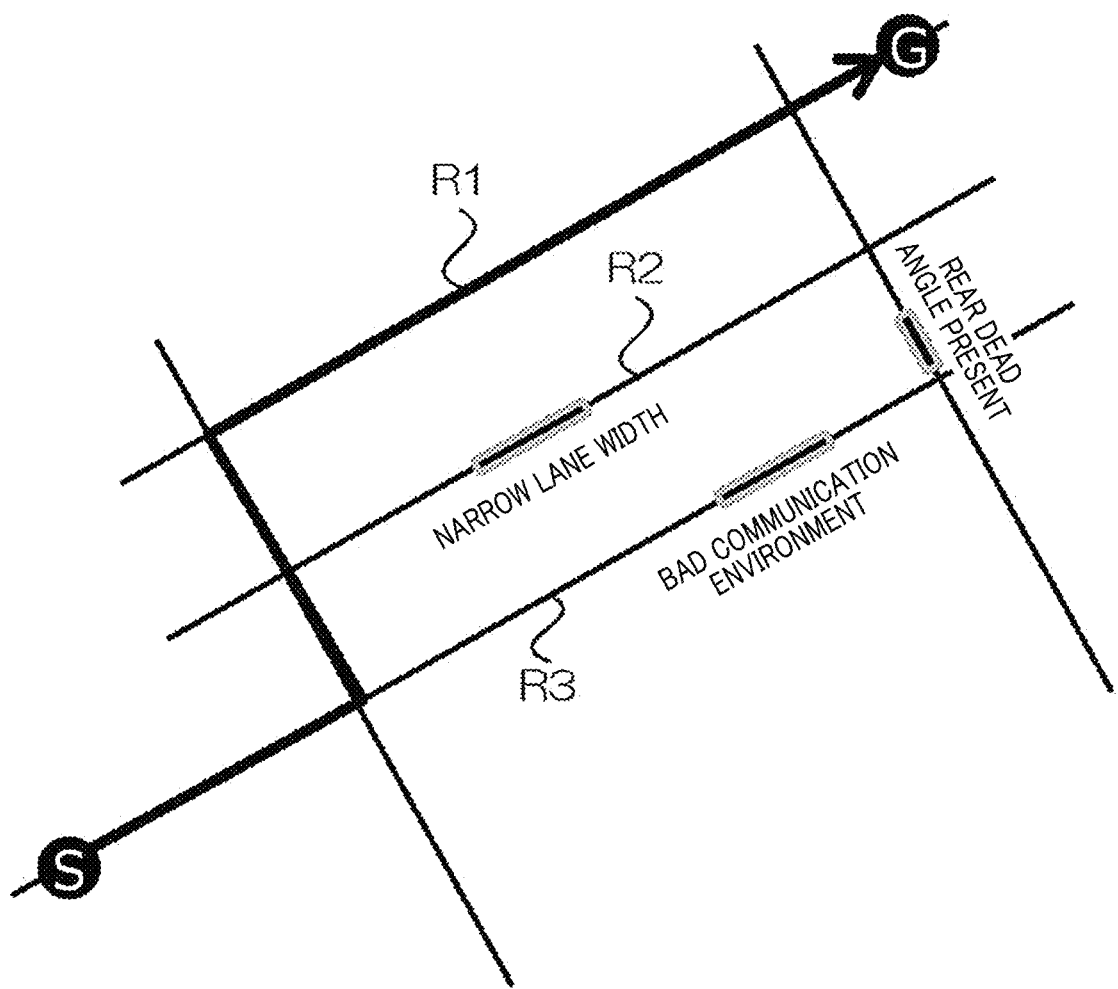
FIG. 11 is a diagram for explaining a process of a server apparatus of the embodiments instructing driving of an autonomous vehicle.

FIG. 11 is a diagram for explaining a process where the server apparatus 20 according to the present embodiment sends a travel instruction to the autonomous vehicle.

In FIG. 11, a point S indicates the origin of the autonomous driving vehicle and a point G indicates the destination of the autonomous driving vehicle. The routes R1 to R3 indicate a plurality of possible routes which connect the point S and the point G.

The communication state and the environmental state are expressed as information related to an operational design domain of the remote support as described above. The management information 25B includes information related to an operational design domain of the remote support and information related to an operational design domain of the autonomous driving vehicle.

For each of the plurality of routes through which the autonomous driving vehicle is able to travel, a cost is assigned reflecting the information related to an operational design domain of the remote support and information related to an operational design domain of the autonomous driving vehicle. Specifically, in FIG. 11, narrow lane width refers to an example of information related to the operational design domain of the autonomous driving vehicle, and bad poor communication environment and rear dead angle being present refer to information related to an operational design domain of the autonomous driving vehicle. For example, cost 3 is assigned for the narrow lane width, cost 2 is assigned for the poor communication environment, and cost 2 is assigned for rear dead angle being present. In this case, since the route R2 includes narrow lane width, the cost 3 is assigned for the route R2. For the route R3, including poor communication environment and rear dead angle being present, cost 4 which is summed is assigned. Since the route R1 does not include the information related to an operational design domain of the remote support and information related to an operational design domain of the autonomous driving vehicle, cost 0 is assigned for route R1.

The instruction unit 21C, in the case where the autonomous driving vehicle is predicted to travel on a route having a cost larger than or equal to a threshold, sends an instruction in which travelling route of the autonomous driving vehicle is changed to a route having the minimum cost. Specifically, in the example shown in FIG. 11, the threshold is set to be 3, and the autonomous driving vehicle is predicted to travel on the route R2, an instruction is sent for changing the travelling route to be the route R1.

In other words, with the instruction from the autonomous driving support center, the travelling route of the autonomous driving vehicle can be changed to a route having better communication state and the environmental state. Hence, the operator performs a remote support with appropriate communication state and environmental state.

Figure 12:
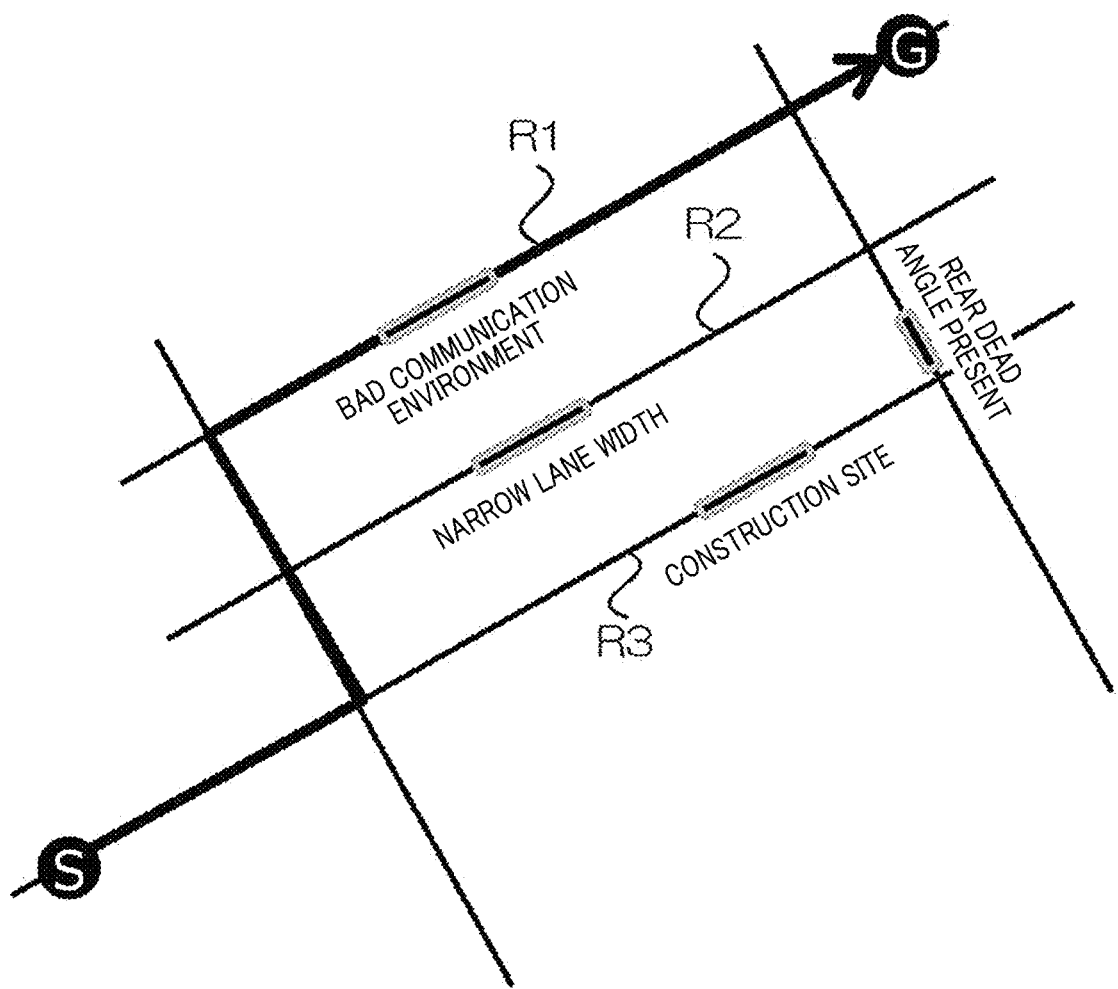
FIG. 12 is a diagram for explaining another process of the server apparatus instructing driving of the autonomous vehicle according to the embodiments.

FIG. 12 is a diagram explaining another process in which the server apparatus 20 according to the present embodiment sends a travelling instruction to the autonomous vehicle.

In FIG. 12, the point S indicate the origin of the autonomous driving vehicle and the point G indicates the destination of the autonomous driving vehicle. The routes R1 to R3 indicates a plurality of routes which connect between the point S and the point G. Note that, narrow lane width and the construction site refers to an example of information related to the operational design domain of the autonomous vehicle, and the poor communication environment and rear dead angle being present refer to information related to an operational design domain of the autonomous driving support.

The instruction unit 21C, in the case where a communication delay has occurred for a prescribed period or more on the image of the autonomous vehicle which the operator is monitoring, sends an instruction to decrease the travelling speed of the autonomous vehicle. Specifically, in the example of FIG. 12, the autonomous vehicle is expected to travel on the route R1. The route R1 is in a state where a poor communication section is included and a communication delay has occurred for more than 1 second in the poor communication section. In this case, the travelling speed of the autonomous driving vehicle travelling on the route R1 is decreased.

That is, with the instruction of the autonomous driving support center, the travelling speed of the autonomous driving vehicle is decreased, whereby a relative speed between the autonomous driving vehicle and the on-coming vehicle can be decreased. Hence, the operator is able to perform the remote support in a recovered communication state.

Figure 13:
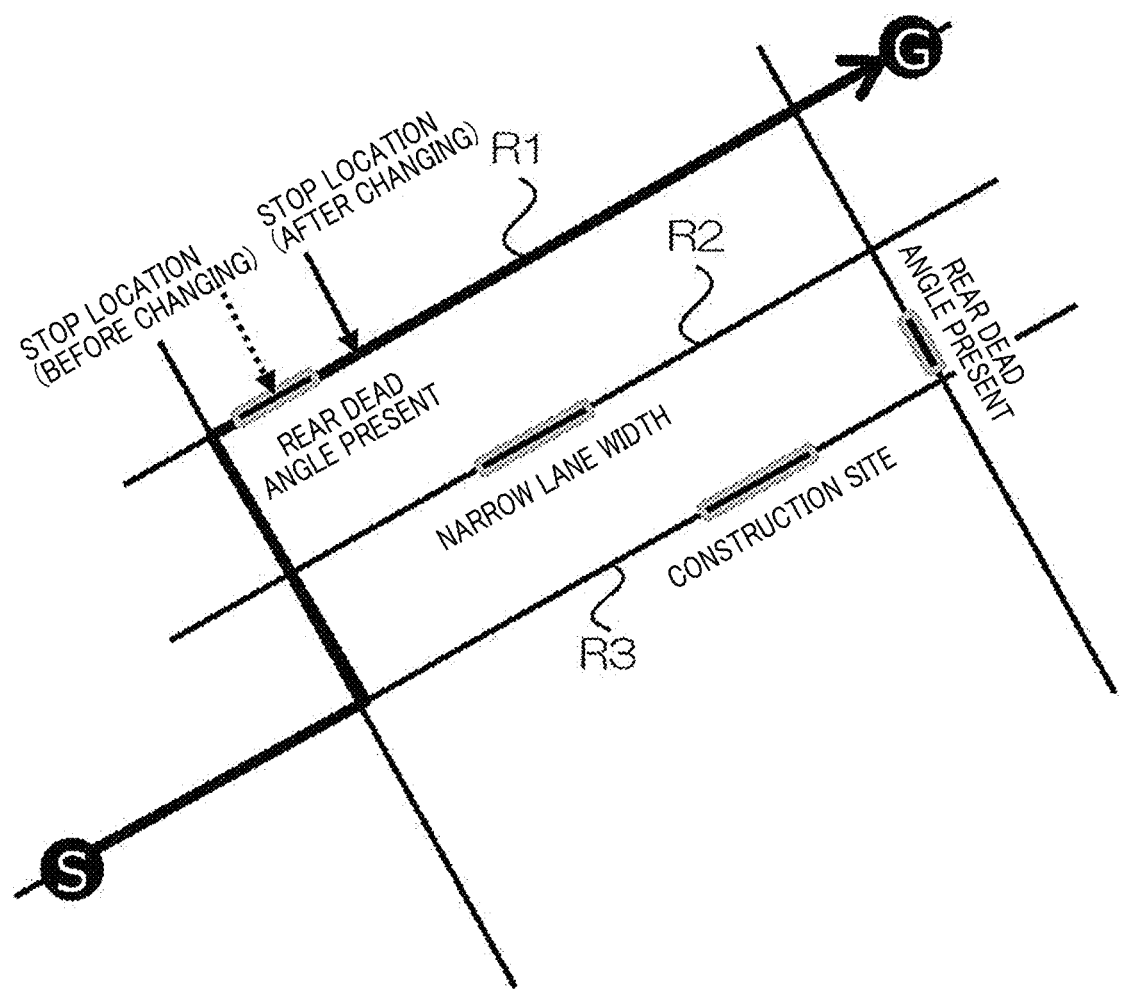
FIG. 13 is a diagram for explaining yet another process of the server apparatus instructing driving of the autonomous vehicle according to the embodiments.

FIG. 13 is a diagram explaining yet another process in which the server apparatus 20 according to the present embodiment sends a travelling instruction to the autonomous vehicle.

In FIG. 13, the point S indicate the origin of the autonomous driving vehicle and the point G indicates the destination of the autonomous driving vehicle. The routes R1 to R3 indicates a plurality of routes which connect between the point S and the point G. Note that, narrow lane width and construction site refer to an example of information related to the operational design domain of the autonomous vehicle, and the rear dead angle being present refers to information related to an operational design domain of the autonomous driving support.

The instruction unit 21C sends, in the case where the autonomous driving vehicle is estimated to stop at a location having low rear visibility, an instruction to set or change the stop location of the autonomous driving vehicle to be a location having better rear visibility. For example, when the stop location is set at sooner location than that of the estimation (passenger's destination), the stop location is changed, and when the stop location is set at further location than that of the estimation (emergency care required for a passenger), the stop location is newly set. Specifically, in an example shown in FIG. 13, it is assumed that the autonomous driving vehicle stops on the route R1. The route R1 includes a case of rear dead angle being present, and the stop location (before changing) corresponding to the case of the read dead angle being present indicates a location showing a low rear visibility. In this stop location (before changing), for example, passenger's desired stop location and a temporary stop location in case of emergency care are set. With this stop location (before changing), since there is a dead angle in the rear side when re-starting the autonomous driving vehicle, departure is difficult to accomplish. In this case, the stop location of the autonomous driving vehicle is changed to a location having better rear visibility from a location having bad rear visibility. Note that the stop location (after changing) indicates a location having better rear visibility.

That is, with the instruction of the autonomous driving support center, the stop location of the autonomous driving vehicle can be changed to the location having better rear visibility from the location having bad rear visibility. Hence, in the case where the operator performs a remote support, the determination of departure can be done when re-starting the autonomous driving vehicle.

Figure 14:
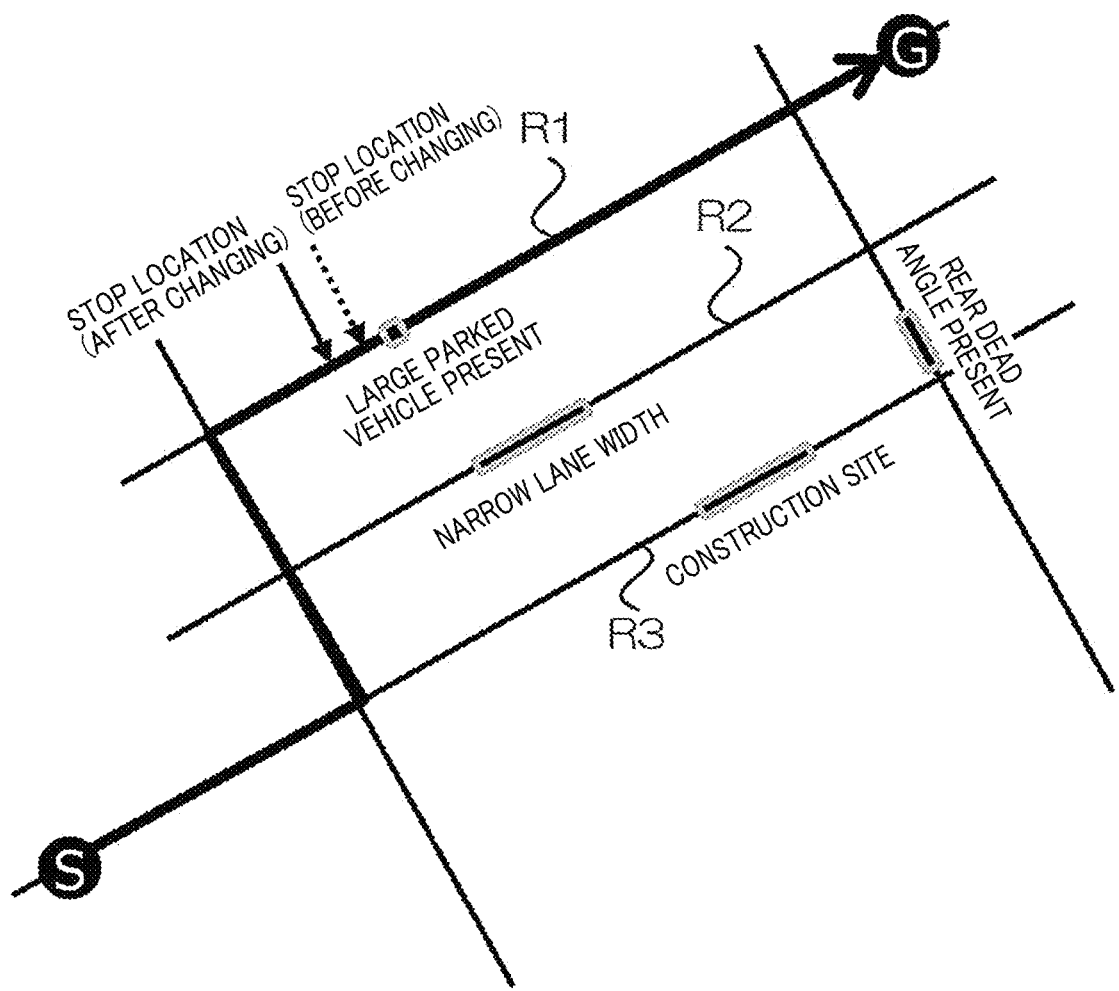
FIG. 14 is a diagram for explaining yet another process of the server apparatus instructing driving of the autonomous vehicle according to the embodiments.

FIG. 14 is a diagram explaining yet another process in which the server apparatus 20 according to the present embodiment sends a travelling instruction to the autonomous vehicle.

In FIG. 14, the point S indicate the origin of the autonomous driving vehicle and the point G indicates the destination of the autonomous driving vehicle. The routes R1 to R3 indicates a plurality of routes which connect between the point S and the point G. Note that, narrow lane width and construction site refers to an example of information related to the operational design domain of the autonomous vehicle, and a large parked vehicle being present and the rear dead angle being present refer to information related to an operational design domain of the autonomous driving support.

The instruction unit 21C sends, in the case where the autonomous driving vehicle is estimated to stop at a location having low front visibility, an instruction to set or change the stop location of the autonomous driving vehicle to be a location having better front visibility. Specifically, in an example shown in FIG. 14, it is assumed that the autonomous driving vehicle stops on the route R1. The route R1 includes a case of a large parked vehicle being present, and the stop location (before changing) corresponding to a case of the large parked vehicle being present indicates a location showing a low front visibility. For example, the stop location (before changing) is set to be a location immediately before the large parked vehicle is present. According to this stop location (before changing), since a state in front of the large parked vehicle is difficult to determine, a determination for passing is difficult to perform. In this case, the stop location of the autonomous driving vehicle is changed to a location having better front visibility from a location having bad front visibility. According to the example of FIG. 14, the stop location is changed to be closer location compared to the stop location (before changing). The stop location (after changing) indicates a location having better front visibility.

In other words, with the instruction from the autonomous driving support center, the stop location of the autonomous driving vehicle can be changed to a location having better front visibility from a location having bad front visibility. Hence, in the case where the operator performs remote support, a determination for passing the large parked vehicle can be performed.

Further, in the case where the autonomous driving vehicle is predicted to stop at a location where the communication state between the autonomous driving vehicle and the autonomous support center is unstable, the instruction unit 21C may send an instruction to set or change the stop location of the autonomous driving vehicle to be a location where the communication state between the autonomous driving vehicle and the autonomous driving support center is stable. For example, as described above, when the stop location is set at sooner location than that of the estimation (passenger's destination), the stop location is changed, and when the stop location is set at latter location than that of the estimation (emergency care required for a passenger), the stop location is newly set. Specifically, in an example shown in the above-described FIG. 12, it is assumed that the autonomous driving vehicle is temporarily stopped on the route R1. The route R1 includes a case of poor communication state and the state thereof is that the communication delay has occurred for more than or equal to 1 second at the location where the poor communication has occurred. In this case, the stop location of the autonomous driving vehicle is changed to a location where the communication state is stable from a location where the communication state is unstable.

That is, with the instruction from the autonomous driving support center, the stop location of the autonomous driving vehicle can be changed to a location where the communication state is stable from a location where the communication state is unstable. Hence, the operator is able to perform a remote support under a stable communication state.

Note that, in this case, the instruction unit 21C may receive the support request of the autonomous driving vehicle from the stop location which is changed in accordance with the instruction sent from the autonomous driving support center. Thus, the support request can be reliably received.

Next, with reference to FIG. 15, effects of the server apparatus 20 according to the second embodiment will be described.

Figure 15:
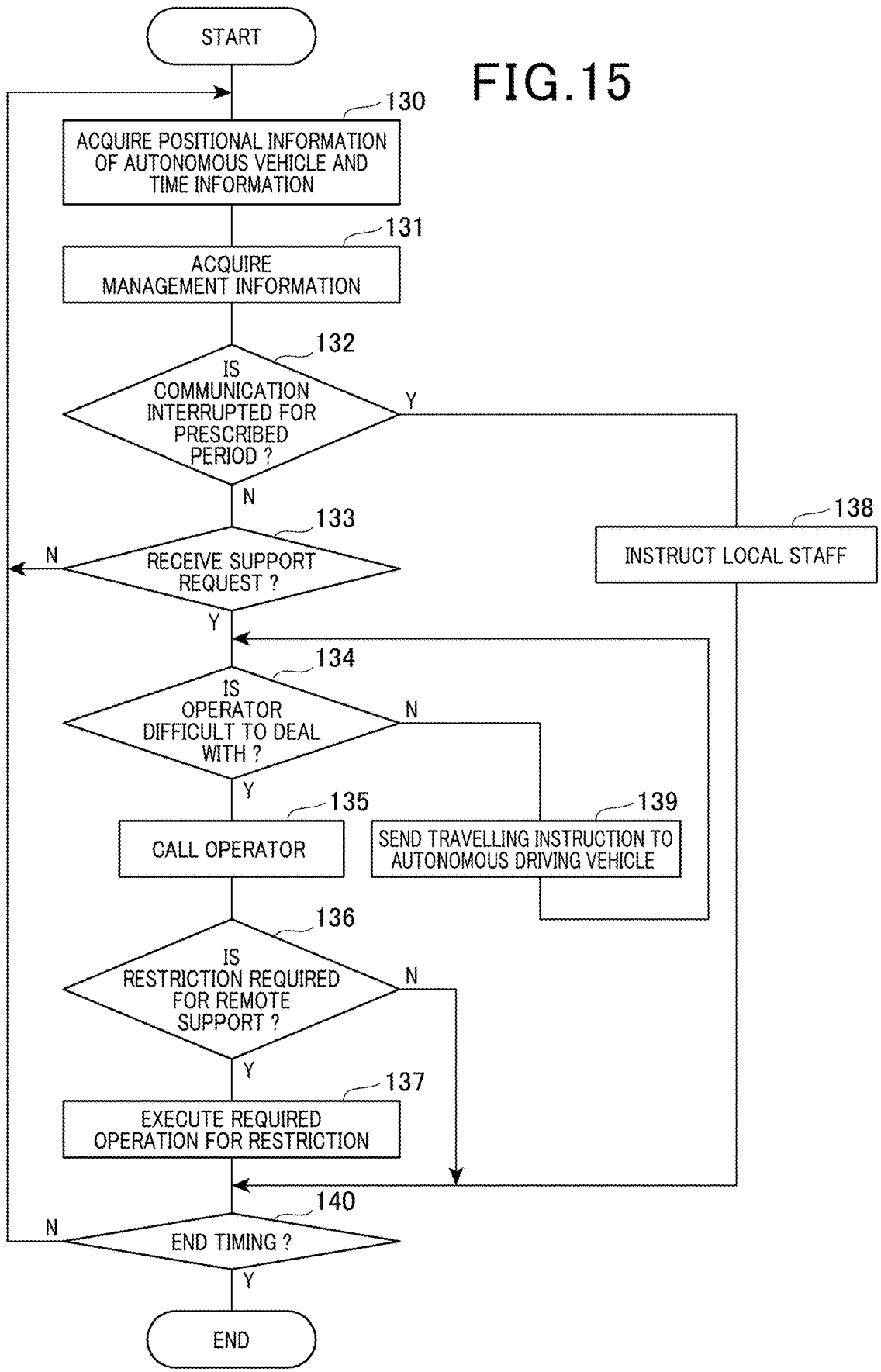
FIG. 15 is a flowchart showing an example of a process of a remote support program according to a second embodiment.

FIG. 15 is a flowchart showing an example of a process of a remote support program 25A according to the second embodiment.

Firstly, in the case where an instruction to monitor a vehicle state of the autonomous driving vehicle is sent to the server apparatus 20, the remote support program 25A is activated and the following steps are executed.

At step 130 shown in FIG. 15, the CPU 21 acquires the positional information of the autonomous driving vehicle and the time information from the on-vehicle apparatus 10 of the autonomous driving vehicle.

At step S131, the CPU 21 acquires the management information 25B from the storage unit 25.

At step 132, the CPU 21 determines whether a communication state with the autonomous driving vehicle is interrupted for a prescribed period. When the process determines that the communication state is not interrupted for a prescribed period (negative determination), the process proceeds to step 133 and when the process determines that the communication state is interrupted for a prescribed period (affirmative determination), the process proceeds to step 138. In these steps, it is determined whether a communication is interrupted for a prescribed period, but it may be determined whether a communication bandwidth is not secured for a prescribed width or more.

At step 133, the CPU 21 determines whether a support request is received from the autonomous driving vehicle. When it is determined that the support request is received from the autonomous driving vehicle (affirmative determination), the process proceeds to step 104, and when it is determined that no support request is received from the autonomous driving vehicle, the process returns to step 130 and repeats the processes.

At step 134, the CPU 21 determines whether the operator is difficult to deal with. When the operator is cannot deal with, as described above, the determination is made based on the management information 25B. When determined that the operator is not difficult to deal with, that is, the operator is able to deal with the situation (negative determination), the process proceeds to step 135 and when determined that the operator is in a difficult situation dealing with the problem (affirmative determination), the process proceeds to step 139.

At step 135, the CPU 21 instructs the operator terminal 30 to call an operator.

At step 136, the CPU 21 determines whether restriction of the remote support is necessary. As described above, the determination whether the remote support is necessary is based on the management information 25B. When determined that the restriction is necessary for the remote support (affirmative determination), the process proceeds to step 137, and when determined that the restriction of the remote support is not necessary (negative determination), the process proceeds to step S140.

At step 137, the CPU 21 executes necessary operations to restrict the remote support for the operator terminal 30 and proceeds to step 140. The necessary operations to restrict the remote support is, for example, as shown in the above-described FIG. 4, an operation to make the operator terminal 30 display a message notifying contents of abnormalities of at least one of the communication state and the environmental state, or an operation to restrict the functions of the remote support included in the operator terminal 30.

On the other hand, at step S138, the CPU 21 instructs the staff terminal 40 of the local staff to rapidly deal with the autonomous vehicle and proceeds to step 140. For example, as described above, the CPU 21 instructs the operation by displaying a message on the display unit 44 of the staff terminal 40.

On the other hand, at step 139, as an example, the CPU 21 sends a travelling instruction to the autonomous driving vehicle as shown in the above-described FIGS. 11 to 14, returns to step 134 and repeats the processes.

At step S140, the CPU 21 determines whether the end timing of the remote support has been reached. When determined that it the end timing of the remote support has not been reached (negative determination), the process returns to step 130 and repeats the processes, and when determined that the end timing of the remote support has been reached (affirmative determination), the process terminates the series of processes of the present remote support program 25A.

Next, with reference to FIG. 16, effects of the on-vehicle apparatus 10 according to the second embodiment will be described.

Figure 16:
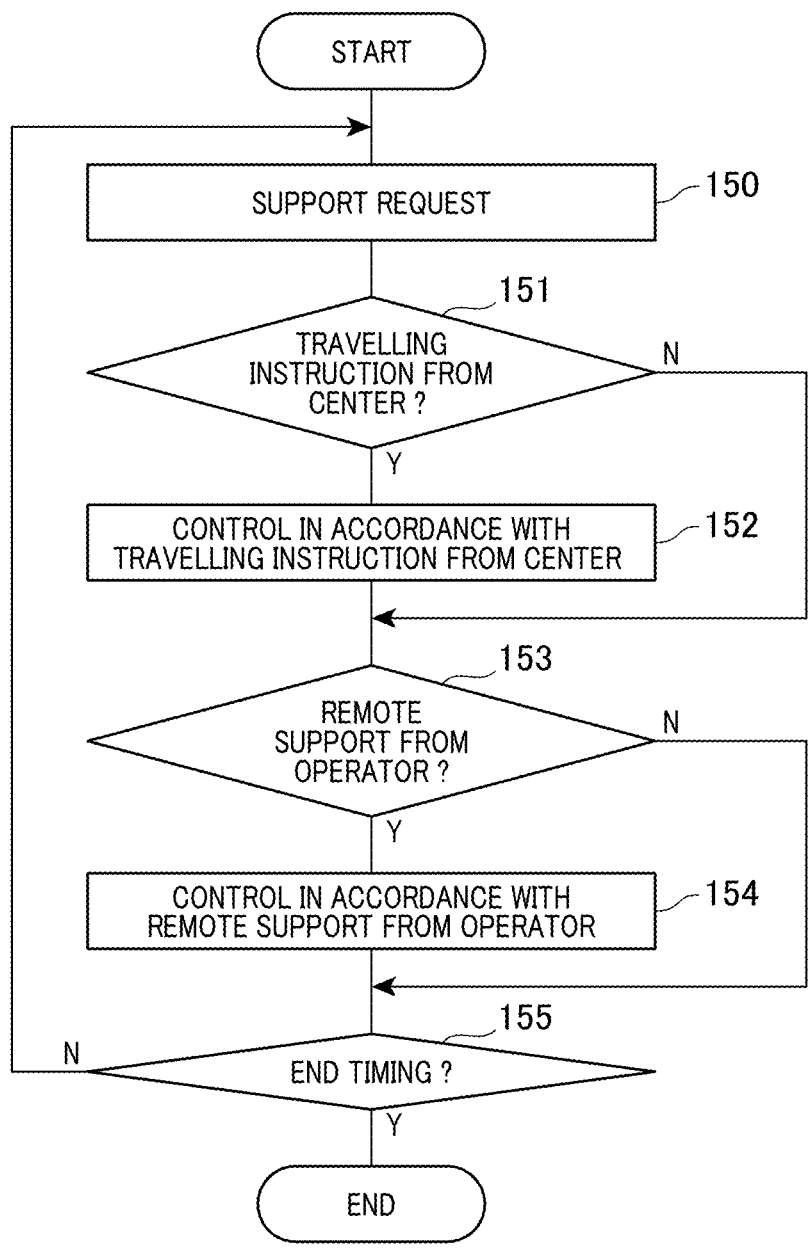
FIG. 16 is a flowchart showing an example of a process of the remote support program according to the second embodiment.

FIG. 16 is a flowchart showing an example of a process of a vehicle side control program 15A according to the second embodiment.

At step 150 shown in FIG. 16, the CPU 11 transmits a support request for remote support to the server apparatus 20.

At step 151, the CPU 11 determines whether a travelling instruction is received from the server apparatus 20 of the autonomous support center in response to the support request transmitted at step 150. When determined that the travelling instruction is received (affirmative determination), the process proceeds to step 152, and when determined that the travelling instruction is not received (negative determination), the process proceeds to step 153.

At step 152, the CPU 11 performs a control in accordance with the travelling instruction of the server apparatus 20 of the autonomous driving support center.

At step 153, the CPU 11 determines whether a remote support is from the operator terminal 30 used by the operator. When determined that the remote support is present (affirmative determination), the process proceeds to step 154, and when determined that the remote support is not performed (negative determination), the process proceeds to step 155.

At step 154, the CPU 11 performs control in accordance with the remote support from the operator terminal 30 used by the operator.

At step 155, the CPU 21 determines whether the end timing of the remote support has been reached. When determined that the end timing of the remote support has not been reached (negative determination), the process returns to step 150 and repeats the processes, and when determined that the end timing of the remote support has been reached (affirmative determination), the process terminates the series of processes of the present vehicle side control program 25A.

Thus, according to the present embodiment, in the case where the operator it is in a difficult situation dealing with the problem, the travelling instruction of the autonomous vehicle is transmitted from the autonomous driving support center. Thus, even in the case where the operator is in a difficult situation dealing with the problem, the remote support by the operator can be accomplished.

Third Embodiment

According to the present embodiment, the on-vehicle apparatus acquires the management information from the autonomous driving support center, and controls the own vehicle to be stopped at a location having a good communication state.

Figure 17:
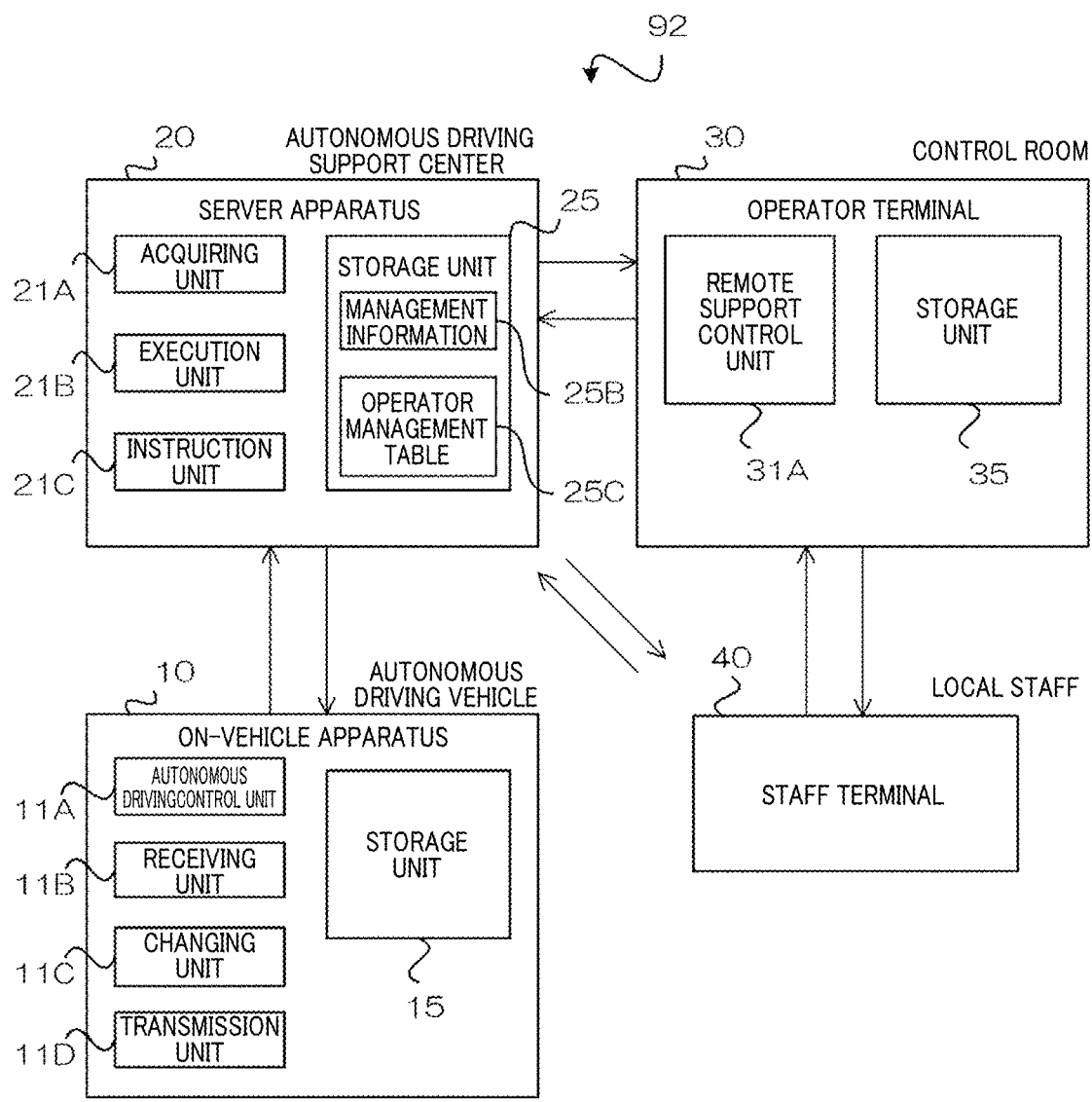
FIG. 17 is a block diagram showing an example of a functional configuration of a remote support system according to a third embodiment.

FIG. 17 is a block diagram showing an example of a functional configuration of the remote support system 92 according to the third embodiment. Note that, constituents having the same function as the remote support system 91 described in the above-described second embodiment are applied with the same reference symbols and repeated explanation will be omitted.

As shown in FIG. 17, the CPU 11 of the on-vehicle apparatus 10 according to the present embodiment functions as a receiving unit 11B, a changing unit 11C and a transmission unit 11D. These receiving unit 11B, the changing unit 11C and the transmission unit 11D are accomplished by reading and executing the vehicle side control program 15A with the CPU 11.

The receiving unit 11B receives the management information 25B from the server apparatus 20.

The changing unit 11C changes the stop location of the own vehicle, when the own vehicle is predicted to stop at a location where the communication state between the own vehicle and the autonomous driving support center is unstable, to be a location where the communication state between the own vehicle and the autonomous driving support center is stable.

The transmission unit 11D transmits the support request of own vehicle from the stop location which is changed by the changing unit 11C.

Figure 18A:
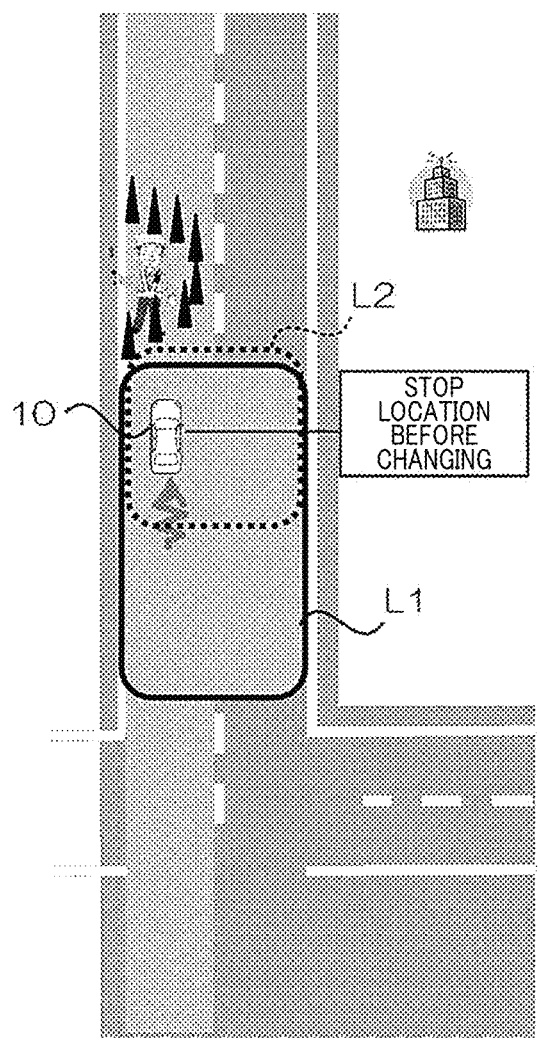
FIG. 18A is a diagram showing a stop location of the autonomous vehicle before changing according to the embodiments.
Figure 18B:
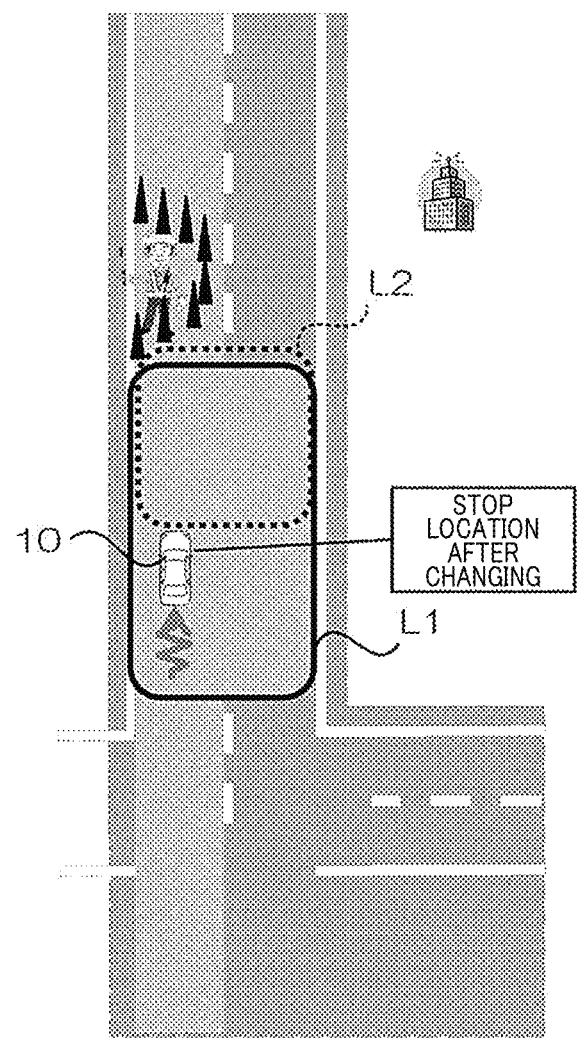
FIG. 18B is a diagram showing a stop location of the autonomous vehicle after changing according to the embodiments.

FIG. 18A is a diagram showing a stop location of the autonomous vehicle before changing according to the present embodiment. FIG. 18B is a diagram showing a stop location of the autonomous vehicle after changing according to the present embodiment. In FIGS. 18A and 18B, an area L1 indicates a range capable of communicating with the autonomous driving support center, and an area L2 indicates an area where the communication state is unstable.

As shown in FIG. 18A, the on-vehicle apparatus 10 of the autonomous driving vehicle predicts, based on the management information 25B, that the own vehicle will stop in the area L2. In this case, as shown in FIG. 18B, the on-vehicle apparatus 10 changes the stop location of the own vehicle such that the own vehicle stops within the area L1 and immediately before the area L2. Then, the on-vehicle apparatus 10 transmits a support request to the autonomous driving support center from the changed stop location.

Thus, according to the present embodiment, the management information acquired form the autonomous driving support enter is used, whereby the stop location of the autonomous driving vehicle is changed to a location having better communication state, and the support request is transmitted from the changed stop location. Hence, the support request can be reliably transmitted to the autonomous driving support center.

As described, the remote support system according to the embodiments are exemplified. The embodiments may be accomplished by a program executed by a computer to implement respective functions included in the remote support system. Further, embodiments may be accomplished by a computer readable non-transitory recording media which stores these programs.

The configuration of the remote support system described in the above-described embodiments is an example, but may be modified depending on cases without departing the scope of the disclosure.

Further, a flow of processes in the above-described program in the foregoing embodiments is an example. However, unnecessary steps may be deleted or new steps may be added or execution order may be exchanged in the flow of the above-described program.

Moreover, according to the above-described embodiments, processes according to the embodiments are accomplished by software configuration utilizing a computer in which the programs are executed. However, it is not limited thereto. For example, the embodiments may be accomplished by a hardware configuration, or a combination of the hardware configuration and the software configuration.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

CONCLUSION

As described, the present disclosure provides a remote support system, an on-vehicle apparatus, a remote support method and a remote support which are capable of appropriately performing a remote support to an autonomous vehicle depending on a communication state and an environmental state of the autonomous driving vehicle.

A remote support system according to a first aspect of the present disclosure is provided with an acquiring unit that acquires management information for managing at least one of a communication state between an autonomous driving support center and an autonomous driving vehicle at a plurality of locations, where an autonomous vehicle is able to travel within an area to be managed by the autonomous driving support center, and an environmental state in the vicinity of the autonomous driving vehicle at a plurality of locations, where the autonomous vehicle is able to travel within the area to be managed by the autonomous driving support center; and an execution unit that executes an operation for an operator performing a remote support of the autonomous driving vehicle in accordance with at least one of the communication state and the environmental state acquired from the management information, the operation restricting a remote support function included in an operator terminal used by the operator.

An on-vehicle apparatus according to a second aspect of the present disclosure is mounted on an autonomous driving vehicle which is remote-supported by the remote support system according to the first aspect, and the on-vehicle apparatus is provided with: a receiving unit that receives the management information; a changing unit that changes, in the case where an own vehicle is predicted to stop based on the management information at a location where a communication state between the own vehicle and the autonomous driving support center is unstable, a stop location of the own vehicle to be a location where the communication state between the own vehicle and the autonomous driving support center is stable; and a transmission unit that transmits a support request of the own vehicle from the stop location which is changed by the changing unit.

A remote support method according to a third aspect of the present disclosure includes steps of: acquiring management information for managing at least one of a communication state between an autonomous driving support center and an autonomous driving vehicle at a plurality of locations, where an autonomous vehicle is able to travel within an area to be managed by the autonomous driving support center, and an environmental state in the vicinity of the autonomous driving vehicle at a plurality of locations, where the autonomous vehicle is able to travel within the area to be managed by the autonomous driving support center; and executing an operation for an operator performing a remote support of the autonomous driving vehicle in accordance with at least one of the communication state and the environmental state acquired from the management information, the operation being required for restricting the remote support which is capable of being performed by the operator.

A fourth aspect of the present disclosure is a non-transitory computer readable media storing a remote support program for causing a computer to function as: an acquiring unit that acquires management information for managing at least one of a communication state between an autonomous driving support center and an autonomous driving vehicle at a plurality of locations, where an autonomous vehicle is able to travel within an area to be managed by the autonomous driving support center, and an environmental state in the vicinity of the autonomous driving vehicle at a plurality of locations, where the autonomous vehicle is able to travel within the area to be managed by the autonomous driving support center; and an execution unit that executes an operation for an operator performing a remote support of the autonomous driving vehicle in accordance with at least one of the communication state and the environmental state acquired from the management information, the operation being required for restricting the remote support which is capable of being performed by the operator.

The technique of the present disclosure has effects in which a remote support can be applied to an autonomous vehicle depending on a communication state and an environmental state of the autonomous vehicle.

What is claimed is:

1. A remote support system comprising:
   an acquiring unit that acquires management information that includes first information related to a first operational design domain of remote support of an autonomous driving vehicle and second information related to a second operational design domain of the autonomous driving vehicle, the management information being for managing at least one of:
      a communication state between an autonomous driving support center and the autonomous driving vehicle at a plurality of locations where the autonomous driving vehicle is able to travel within an area to be managed by the autonomous driving support center, the communication state being expressed as part of the first information; or
      an environmental state in the vicinity of the autonomous driving vehicle at the plurality of locations where the autonomous driving vehicle is able to travel within the area to be managed by the autonomous driving support center, the environmental state also being expressed as part of the first information;
   an execution unit that executes an operation for an operator performing the remote support for the autonomous driving vehicle in accordance with at least one of the communication state and the environmental state acquired from the management information, the operation restricting a remote support function included in an operator terminal used by the operator; and
   an instruction unit that sends a travelling instruction to the autonomous driving vehicle in a case where it is determined, based on the management information, that remote support capability is reduced or will be reduced with respect to the situation, wherein:
      a route cost is assigned for each of a plurality of routes through which the autonomous driving vehicle is able to travel, the route cost reflecting the first information related to the first operational design domain of the remote support and the second information related to the second operational design domain of the autonomous driving vehicle, and
      the travelling instruction changes a travelling route of the autonomous driving vehicle to be a route having the minimum route cost in a case where the autonomous driving vehicle is predicted to travel on a route having a particular route cost larger than or equal to a threshold.

2. The remote support system according to claim 1, wherein
the execution unit further executes an operation that notifies an abnormality of at least one of the communication state or the environmental state.

3. The remote support system according to claim 1, wherein
the management information further includes measurement information acquired by measuring an index indicating the communication state for a prescribed period; and
the execution unit is configured to set a content of restriction of the remote support function based on the measurement information.

4. The remote support system according to claim 1, wherein
the execution unit may set a content of the restriction of the remote support function to be different depending on at least one of skill and years of service of the operator.

5. The remote support system according to claim 1, wherein
the instruction unit, in the case where a communication delay has occurred for a prescribed period or more on an image of the autonomous driving vehicle to which the operator is monitoring, sends an additional instruction to decrease a travelling speed of the autonomous driving vehicle.

6. The remote support system according to claim 1, wherein
the instruction unit sends, in the case where the autonomous driving vehicle is predicted to stop at a location having low front visibility or low rear visibility, an additional instruction to set or change a stop location of the autonomous driving vehicle to be a location having better front visibility or better rear visibility.

7. The remote support system according to claim 1, wherein
the instruction unit sends, in the case where the autonomous driving vehicle is predicted to stop at a location where the communication state between the autonomous driving vehicle and the autonomous driving support center is unstable, an additional instruction to set or change a stop location of the autonomous driving vehicle to be a location where the communication state between the autonomous driving vehicle and the autonomous driving support center is stable.

8. The remote support system according to claim 7, wherein
the instruction unit receives a support request of the autonomous driving vehicle from the stop location which is changed in accordance with the additional instruction.

9. The remote support system according to claim 1, wherein
the execution unit sends, in the case where the communication state is interrupted for a prescribed period or a communication bandwidth cannot be secured for a prescribed bandwidth or more, a communication to instruct a local staff who is able to reach the autonomous driving vehicle to deal with the autonomous driving vehicle instead of the operator.

10. The remote support system according to claim 1, wherein the situation cost is the particular route cost.

11. An on-vehicle apparatus mounted on an autonomous driving vehicle which is remote-supported by a remote support system,
the remote support system comprising:
an acquiring unit that acquires management information that includes first information related to a first operational design domain of remote support of an autonomous driving vehicle and second information related to a second operational design domain of the autonomous driving vehicle, the management information being for managing at least one of:
a communication state between an autonomous driving support center and the autonomous driving vehicle at a plurality of locations where the autonomous driving vehicle is able to travel within an area to be managed by the autonomous driving support center, the communication state being expressed as part of the first information; or
an environmental state in the vicinity of the autonomous driving vehicle at the plurality of locations where the autonomous driving vehicle is able to travel within the area to be managed by the autonomous driving support center, the environmental state also being expressed as part of the first information;
an execution unit that executes an operation for an operator performing the remote support of the autonomous driving vehicle in accordance with at least one of the communication state and the environmental state acquired from the management information, the operation restricting a remote support function included in an operator terminal used by the operator and;
an instruction unit that sends a travelling instruction to the autonomous driving vehicle in a case where it is determined, based on the management information, that remote support capability is reduced or will be reduced with respect to the situation, wherein:
a route cost is assigned for each of a plurality of routes through which the autonomous driving vehicle is able to travel, the route cost reflecting the first information related to the first operational design domain of the remote support and the second information related to the second operational design domain of the autonomous driving vehicle, and
the travelling instruction changes a travelling route of the autonomous driving vehicle to be a route having the minimum route cost in a case where the autonomous driving vehicle is predicted to travel on a route having a particular route cost larger than or equal to a threshold; and
the on-vehicle apparatus comprising:
a receiving unit that receives the management information and the travelling instruction;
a changing unit that changes, in a case where an own vehicle is predicted to stop based on the management information at a location where a communication state between the own vehicle and the autonomous driving support center is unstable, a stop location of the own vehicle to be a location where the communication state between the own vehicle and the autonomous driving support center is stable; and
a transmission unit that transmits a support request of the own vehicle from the stop location which is changed by the changing unit.

12. The on-vehicle apparatus according to claim 11, wherein the situation cost is the particular route cost.

13. A remote support method comprising the steps of:
acquiring management information that includes first information related to a first operational design domain of remote support of an autonomous driving vehicle and second information related to a second operational design domain of the autonomous driving vehicle, the management information being for managing at least one of:
a communication state between an autonomous driving support center and the autonomous driving vehicle at a plurality of locations where the autonomous driving vehicle is able to travel within an area to be managed by the autonomous driving support center, the communication state being expressed as part of the first information; or
an environmental state in the vicinity of the autonomous driving vehicle at the plurality of locations where the autonomous driving vehicle is able to travel within the area to be managed by the autonomous driving support center, the environmental state also being expressed as part of the first information;
executing an operation for an operator performing the remote support of the autonomous driving vehicle in accordance with at least one of the communication state and the environmental state acquired from the management information, the operation being required for restricting the remote support which is capable of being performed by the operator, the operation restricting a remote support function included in an operator terminal used by the operator; and
sending a travelling instruction to the autonomous driving vehicle in a case where it is determined, based on the management information, that remote support capability is reduced or will be reduced with respect to the situation, wherein:
a cost is assigned for each of a plurality of routes through which the autonomous driving vehicle is able to travel, the cost reflecting the first information related to the first operational design domain of the remote support and the second information related to the second operational design domain of the autonomous driving vehicle, and
the travelling instruction changes a travelling route of the autonomous driving vehicle to be a route having the minimum route cost in a case where the autonomous driving vehicle is predicted to travel on a route having a particular route cost larger than or equal to a threshold.

14. The remote-support method according to claim 13, wherein the situation cost is the particular route cost.

15. A non-transitory computer readable media storing a remote support program for causing a computer to function as:
an acquiring unit that acquires management information that includes first information related to a first operational design domain of remote support of an autonomous driving vehicle and second information related to a second operational design domain of the autonomous driving vehicle, the management information being for managing at least one of:
a communication state between an autonomous driving support center and the autonomous driving vehicle at a plurality of locations where the autonomous driving vehicle is able to travel within an area to be managed by the autonomous driving support center, the communication state being expressed as part of the first information; or
an environmental state in the vicinity of the autonomous driving vehicle at the plurality of locations where the autonomous driving vehicle is able to travel within the area to be managed by the autonomous driving support center, the environmental state also being expressed as part of the first information;
an execution unit that executes an operation for an operator performing the remote support of the autonomous driving vehicle in accordance with at least one of the communication state and the environmental state acquired from the management information, the operation being required for restricting the remote support which is capable of being performed by the operator, the operation restricting a remote support function included in an operator terminal used by the operator; and
an instruction unit that sends a travelling instruction to the autonomous driving vehicle in a case where it is determined that remote support capability is reduced or will be reduced, wherein:
a cost is assigned for each of a plurality of routes through which the autonomous driving vehicle is able to travel, the cost reflecting the first information related to the first operational design domain of the remote support and the second information related to the second operational design domain of the autonomous driving vehicle;
determining that the remote support capability is reduced or will be reduced is based on the case being such that the autonomous driving vehicle is predicted to travel on a route having a cost larger than or equal to a threshold, and
the travelling instruction changes a travelling route of the autonomous driving vehicle to be a route having the minimum cost.

* * * * *